(12) United States Patent
Snyder et al.

(10) Patent No.: US 11,703,866 B2
(45) Date of Patent: Jul. 18, 2023

(54) SYSTEMS AND METHODS FOR CONTROLLING OPERATIONS OF MARINE VESSELS

(71) Applicant: NAVICO, INC., Tulsa, OK (US)

(72) Inventors: Kristopher C. Snyder, Claremore, OK (US); Jeremy J. Schroeder, Sapulpa, OK (US); Michael C. Kaste, Tulsa, OK (US)

(73) Assignee: NAVICO, INC., Tulsa, OK (US)

( * ) Notice: Subject to any disclaimer, the term of this patent is extended or adjusted under 35 U.S.C. 154(b) by 692 days.

(21) Appl. No.: 16/791,335

(22) Filed: Feb. 14, 2020

(65) Prior Publication Data

US 2021/0255627 A1    Aug. 19, 2021

(51) Int. Cl.
| | |
|---|---|
| G05D 1/02 | (2020.01) |
| B63B 49/00 | (2006.01) |
| G05D 1/00 | (2006.01) |
| G06V 20/20 | (2022.01) |

(52) U.S. Cl.
CPC ........... *G05D 1/0206* (2013.01); *B63B 49/00* (2013.01); *G05D 1/0016* (2013.01); *G05D 1/0038* (2013.01); *G06V 20/20* (2022.01); *B63B 2201/18* (2013.01)

(58) Field of Classification Search
None
See application file for complete search history.

(56) References Cited

U.S. PATENT DOCUMENTS

| | | |
|---|---|---|
| 5,293,351 A | 3/1994 | Noponen |
| 5,420,828 A | 5/1995 | Geiger |
| 6,181,644 B1 | 1/2001 | Gallagher |
| 6,504,794 B2 | 1/2003 | Haase et al. |

(Continued)

FOREIGN PATENT DOCUMENTS

| | | |
|---|---|---|
| DE | 202011051071 U1 | 11/2011 |
| EP | 2 602 639 A1 | 6/2013 |
| GB | 2 421 312 A | 6/2006 |

OTHER PUBLICATIONS

Shepardson; "Google wins U.S. approval for new radar-based motion sensor;" *Reuters*; Jan. 1, 2019; retrieved Feb. 13, 2020 from https://www.reuters.com/article/us-google-sensor/google-wins-u-s-approval-for-radar-based-hand-motion-sensor-idUSKCN1OV1SH.

(Continued)

*Primary Examiner* — Navid Z. Mehdizadeh
(74) *Attorney, Agent, or Firm* — Nelson Mullins Riley & Scarborough LLP

(57) ABSTRACT

Systems, assemblies, and methods for conveniently operating marine devices associated with a watercraft are provided herein. An example system includes a controller, a sensor module, and a marine device. The controller is configured to receive a user input indicating a desired action via the sensor module and transmit a signal to the marine device to cause the marine device to operate in a particular manner. The sensor module may include one or more motion sensors, and the controller may be configured to filter unintentional movement from the raw motion data sensed by the sensor module, such as due to movement of the watercraft floating on the surface of the water. Thus, the system may enable convenient and intuitive control over various marine devices associated with the watercraft.

20 Claims, 15 Drawing Sheets

(56) References Cited

U.S. PATENT DOCUMENTS

| | | |
|---|---|---|
| 6,868,360 B1 | 3/2005 | Olstad et al. |
| 7,190,636 B1 | 3/2007 | Depaola |
| 7,371,218 B2 | 5/2008 | Walston et al. |
| 7,430,461 B1 | 9/2008 | Michaels |
| 7,633,431 B1 | 12/2009 | Wey |
| 8,195,084 B2 | 6/2012 | Xiao |
| 8,896,480 B1 | 11/2014 | Wilson et al. |
| 9,135,731 B2 | 9/2015 | Lauenstein et al. |
| 9,201,142 B2 | 12/2015 | Antao |
| 9,507,562 B2 | 11/2016 | Bailey |
| 9,594,375 B2 | 3/2017 | Jopling |
| 9,596,839 B2 | 3/2017 | Bailey |
| 9,836,129 B2 | 12/2017 | Clark |
| 10,025,312 B2 | 7/2018 | Langford-Wood |
| 10,061,025 B2 | 8/2018 | Kirmani |
| 10,114,119 B2 | 10/2018 | Horner et al. |
| 10,114,470 B2 | 10/2018 | Clark |
| 10,247,823 B2 | 4/2019 | Brown et al. |
| 10,311,715 B2 | 6/2019 | Jopling |
| 10,324,175 B2 | 6/2019 | Laster |
| 10,451,732 B2 | 10/2019 | Laster |
| 10,460,484 B2 | 10/2019 | Hovland et al. |
| 10,921,802 B2 | 2/2021 | Bertrand et al. |
| 2012/0299764 A1 | 11/2012 | Haneda et al. |
| 2016/0125739 A1 | 5/2016 | Stewart et al. |
| 2016/0253150 A1 | 9/2016 | Williams et al. |
| 2017/0038460 A1 | 2/2017 | Clark |
| 2017/0285167 A1 | 10/2017 | Proctor et al. |
| 2017/0300056 A1 | 10/2017 | Johnson et al. |
| 2017/0371039 A1 | 12/2017 | Clark et al. |
| 2018/0074596 A1* | 3/2018 | Clark .................... G01S 15/87 |
| 2018/0288990 A1 | 10/2018 | Laster et al. |
| 2018/0329056 A1 | 11/2018 | Smith et al. |
| 2018/0365246 A1 | 12/2018 | Laster et al. |
| 2019/0072951 A1 | 3/2019 | Clark et al. |
| 2019/0137993 A1* | 5/2019 | Bertrand ................ B63H 25/02 |
| 2019/0322340 A1* | 10/2019 | Clark ..................... G01S 15/96 |
| 2019/0331779 A1 | 10/2019 | Sandretto |

OTHER PUBLICATIONS

Feldler; "Teaching With NYT Virtual Reality Across Subjects;" *The New York Times*; Mar. 28, 2019; retrieved Feb. 13, 2020 from https://www.nytimes.com/2019/03/28/learning/lesson-plans/teaching-with-nyt-virtual-reality-across-subjects.html.

Smolan et al; "The Click Effect;" *New York Times VR*; retrieved Feb. 13, 2020 from https://www.with.in/watch/CnVHWFg.

Magic Leap Quick Start Guide; 2018; retrieved Feb. 13, 2020 from https://assets.ctfassets.net/b173eiperqoo/4H4PJgU9C0GvSyie4QeuWE/c7ef230a10147e86173dd9250ce5b064/180606_QSG_277x190mm_PANTONE_v1.pdf.

*Google Glass*; Wikipedia; retrieved Apr. 18, 2013 from http://en.wikipedia.org/wiki/Google_Glass.

*Navico set to GoFree*; May 1, 2012; retrieved Apr. 18, 2013 from http://www.marinebusiness.com.au/archive/navico-set-to-gofree.

Jun. 16, 2014 Search Report and Written Opinion issued in International Patent Application No. PCT/US2014/021133.

Porathe; "3-D Nautical Charts and Safe Navigation;" Department of Innovation, Design and Product Development; Doctoral Dissertation No. 27, Mälardalen University; Jan. 1, 2006; pp. 1-307 (XP055119720).

* cited by examiner

SYSTEMS AND METHODS FOR CONTROLLING OPERATIONS OF MARINE VESSELS

FIELD OF THE DISCLOSURE

Embodiments of the present disclosure relate generally to control of marine devices and, more particularly, to systems and methods for improved operational control of marine devices on a watercraft.

BACKGROUND OF THE DISCLOSURE

Conventional control over the operation of various marine devices onboard a watercraft may be difficult during fishing or other boating activities. For example, it may be inconvenient, distracting, or non-intuitive to reach and/or manipulate a marine multifunctional display (e.g., mounted at a helm of the watercraft). Additionally, the visibility of mounted marine displays may be affected by the environment (e.g., weather, lighting, sunlight). Sometimes, a user may not have hands free in order to press buttons and/or operate a touchscreen display. For example, a user may need to maintain hand control of a steering wheel, fishing rod, trolling motor, etc., which may make it difficult to otherwise operate marine equipment using conventional button or touchscreen-based user input.

Sometimes, a user may not have hands free in order to press buttons and/or operate a touchscreen display. For example, a user may lose a hooked fish while attempting to drop anchor or control a trolling motor (e.g., with a foot pedal) because they were forced to let go of the rod or reposition themselves on the boat.

Moreover, obstacles—such as motion of the boat and various materials coating fingers (e.g., oils, sunscreen, fish, water, gloves, etc.)—may interfere with current interactions with marine electronics that require touch (e.g., touchscreen displays, graphical user interfaces, buttons, switches, keys, etc.) making them harder to control.

Applicant has developed systems and methods detailed herein to improve operational control of marine devices onboard watercrafts.

BRIEF SUMMARY OF THE DISCLOSURE

Example embodiments of the present disclosure provide systems, methods, and assemblies for optimizing control over various marine devices onboard a watercraft. In some embodiments, the disclosed systems and methods may advantageously minimize need for manual or touch interactions with an onboard human-computer interface (e.g., multi-functional display (MFD), switch panel, etc.). In some embodiments, rather than require touch or contact to operate the various marine devices connected to the system, a sensor module enables the user to send commands in a touchless manner via a controller. Moreover, such commands may be intuitive and/or non-disturbing (e.g., pointing a user's head in the desired sonar, radar, or map direction to cause the corresponding shift in perspective view from the corresponding marine device, among many other examples described herein).

The example fish-finding sonar and other systems disclosed herein may operate without requiring manual or physical interaction with a human-computer interface (e.g., touchscreens, buttons, switches, keys, etc.). In this way, the example systems may make better use of natural hand, body, and face gestures, such as to allow the user to point the marine device while freeing the user's hands for fishing and/or boating activities, for example. Moreover, the intuitive nature of the example systems may make it easy for the user to understand how the marine device is operating—such as where (e.g., in which direction) the marine device is pointing, for example.

In some embodiments, marine imagery and/or data may be displayed to the user as part of an immersive virtual reality (VR) experience. For example, VR may improve or enhance fish finders or radar.

In some embodiments, the sensor module may include motion sensing to control various operations of the connected marine devices via the controller. For example, the sensor module may include a radar-based motion sensor to detect gestures and/or actions from the user (e.g., within a field of view of the motion sensor) to operate a marine device in accordance with the configuration of the controller. In addition, the controller may be configured to filter out unintentional movements of the user or sensor, such as may be caused by motion of the marine vessel (e.g., rolling of the watercraft floating on the surface of the water).

In some embodiments, the sensor module may be built-in to a trolling motor assembly and configured to easily interface with a built-in controller and/or integration hub of the marine vessel. For example, the sensor module may include a vibration sensor for detecting vibrations of the user (e.g., stomping, sounds, vocalizations), and the system may be configured such that a sensed pattern of vibrations causes the controller to send a signal to the connected marine device (e.g., anchor system) to perform an action (e.g., drop an anchor). In this way, a user may conveniently maintain freedom of limbs and/or the particular position on the marine vessel for reeling in a fish or other intensive activities.

In one exemplary embodiment, a system for controlling operations of a marine vessel is provided. The system may include a user input device, a display, and a controller. The user input device may include a three-dimensional orientation sensor that can detect a first orientation of the user input across three dimensional axes and a second orientation, after a time interval, and transmit the first and second orientations to the controller. The controller may be configured to generate a raw orientation difference data set by comparing the first orientation to the second orientation and to determine a difference in orientation by correcting the raw orientation difference data set using a marine vessel motion compensation data set. The marine vessel motion compensation data set may be based on movement of the marine vessel during the time interval between detecting the first and second orientations of the user input device. The controller may be further configured to determine a three-dimensional orientation based on the determined difference in orientation and transmit a corresponding electrical signal to cause the display to show one or more marine images corresponding to the determined three-dimensional orientation. The electrical signal corresponding to the determined three-dimensional orientation may cause a sonar device to adopt a corresponding orientation. The user input device may be a mobile media device. The display may be within a virtual reality headset or located on the mobile media device. The one or more marine images may include real time sonar data. The movement of the marine vessel during the time interval between the detection of the first and second orientations may be captured by an accelerometer. The controller may be further configured to process the determined difference in orientation to determine whether the difference in orientation is an unintended command.

In another exemplary embodiment, a system for controlling operations of a marine vessel through gestures of a user is provided. The system may include a controller and a sensor module mounted to the marine vessel. The sensor module may be configured to detect gestures of the user by detecting and transmitting both a first position of one or more objects within a field of view of the sensor module, at a first time, and a second position of one or more objects within the field of view, at a later second time. The controller may be configured to receive and store the detected first and second positions of the one or more objects from the sensor module in a memory and to generate a difference data set by comparing the first and second positions of the one or more objects. The controller may then modify the difference data set by filtering difference data falling within a marine vessel movement data set. The marine vessel movement data set may be based on movement of the marine vessel between the first and second times when the first and second positions were detected. The controller may be further configured to process the modified difference data set to identify one or more gestures, to determine a desired action based on the identified one or more gestures, and to transmit a signal to a marine device to cause the marine device to operate according to the desired action. The sensor module may be configured to detect objects within the field of view using a projected light pattern. The sensor module may use an external tracked device as the only object detected in the field of view and determine gestures based on a position and/or orientation change of the external tracked device within the modified difference data set. The movement of the marine vessel between detection of the first and second positions at the first and second times may be captured by an accelerometer. The marine device may be a multi-function display or a trolling motor. The identified gesture may be a hand wave, and the determined desired action may be changing a display mode. The one or more gestures may be identified as an unintended command, in which case the determined desired action may be no action.

In another exemplary embodiment, a system for controlling operations of a marine vessel through actions of a user is provided. The system may include a sensor module and a controller. The sensor module may be configured to detect vibrations caused by the user, and, based on the detected vibrations, to generate and transmit a vibration signal. The controller may be configured to receive the vibration signal from the sensor module and to transmit a signal to a marine device to cause the marine device to perform an operation. The sensor module may include a microphone that detects sound vibrations and/or an accelerometer that detects vibrations above a certain threshold. The sensor module may be located within a trolling motor and/or a multi-function display on the marine vessel. The sensor module may be further configured to generate and transmit the vibration signal only if the detected vibrations match a predetermined pattern (e.g., three stomps within a predetermined time). The marine device may be an anchor, and the operation may be changing state from undeployed to deployed.

In another exemplary embodiment, a system for controlling operations of a marine vessel through actions of a user is provided. The system may include a sensor module and a controller. The sensor module may be configured to detect a rotational angle change of a pedal for a trolling motor assembly caused by the user. The sensor module may be further configured to generate and transmit a rotational angle change signal based on the detected rotational angle change caused by the user. The controller may receive the rotational angle change signal from the sensor module and then transmit a signal to a marine device to cause the marine device to perform an operation. The controller may be configured to determine a total number of rotational angle change signals received within a predetermined amount of time and, based on the determined total number, to generate and transmit the signal to the marine device.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE DRAWINGS

Figure 1:
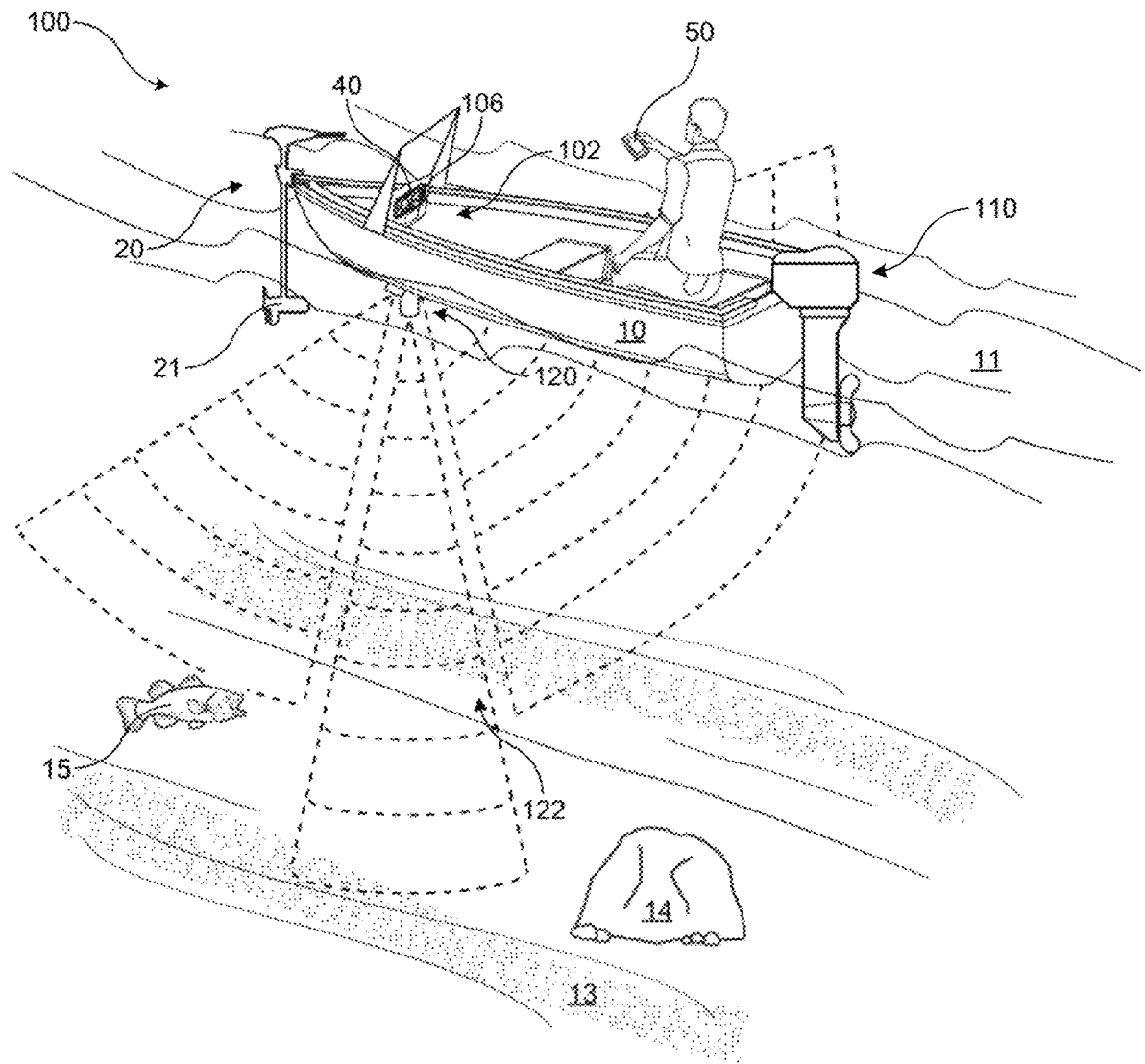
Figure 2:
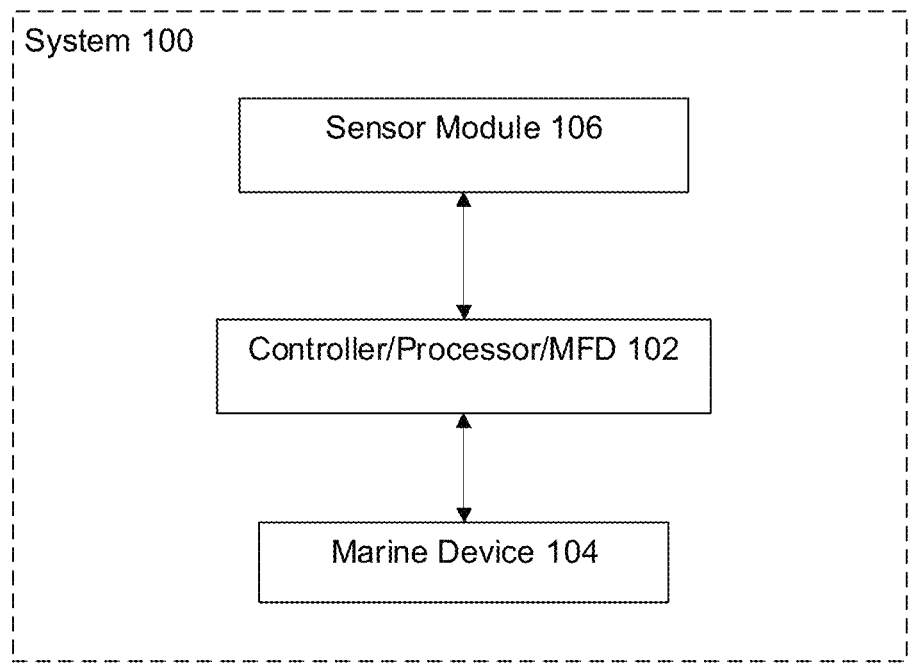
Figure 3:
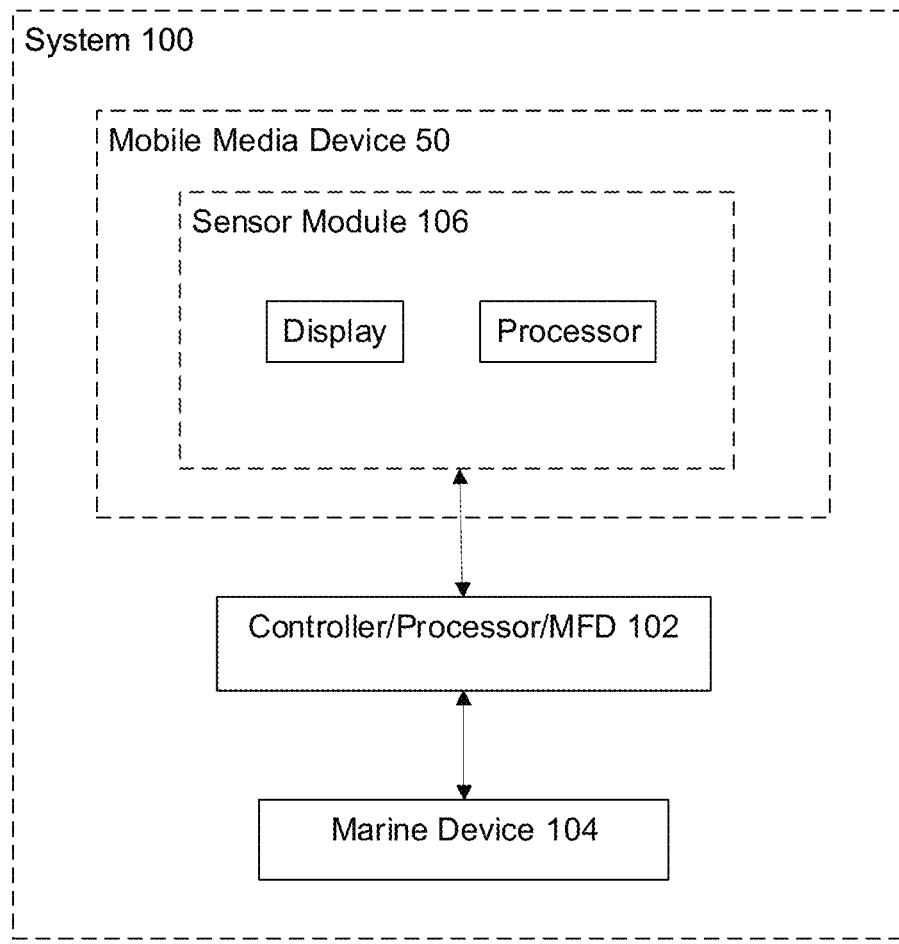
Figure 4:
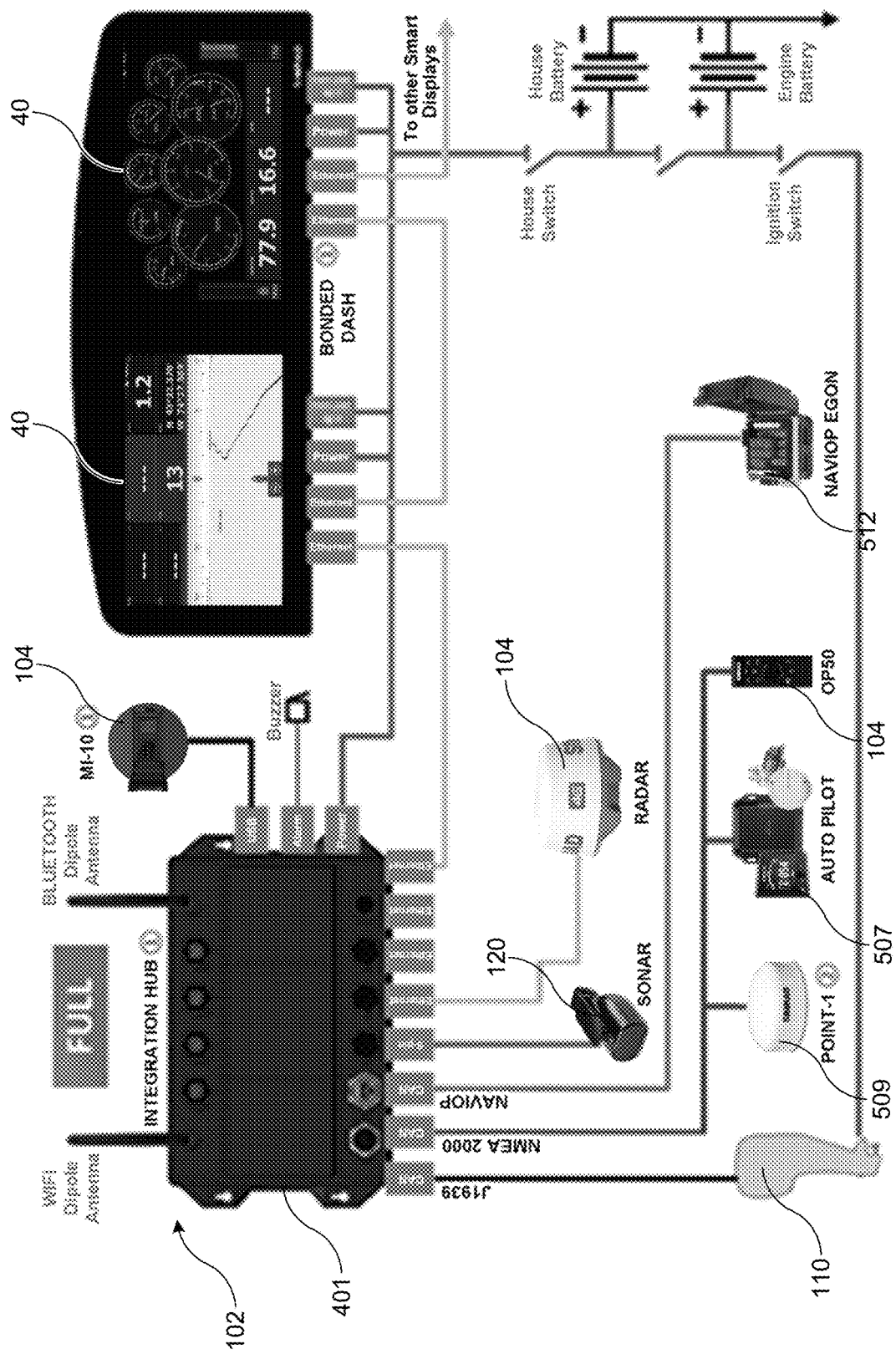
Figure 5:
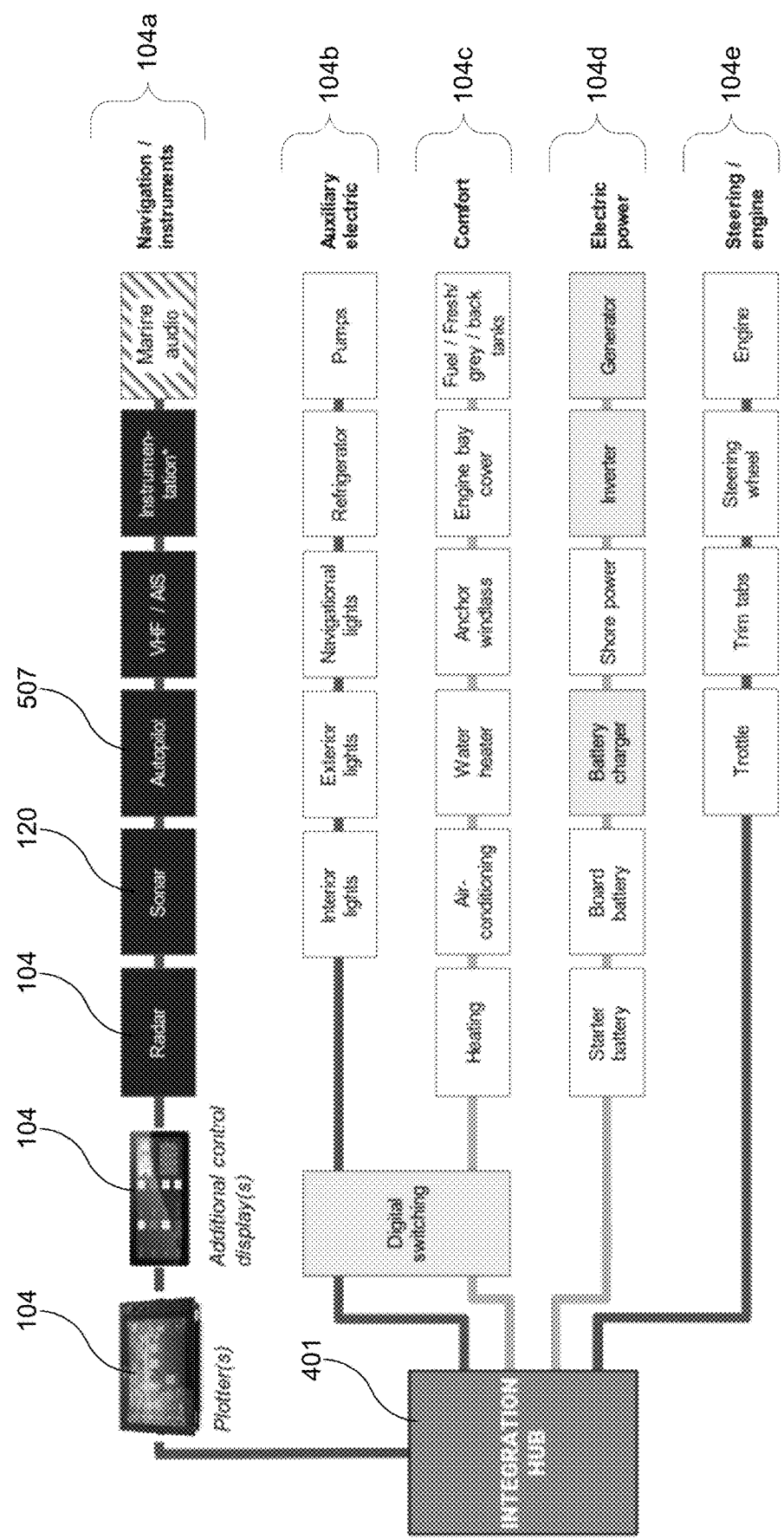
Figure 6:
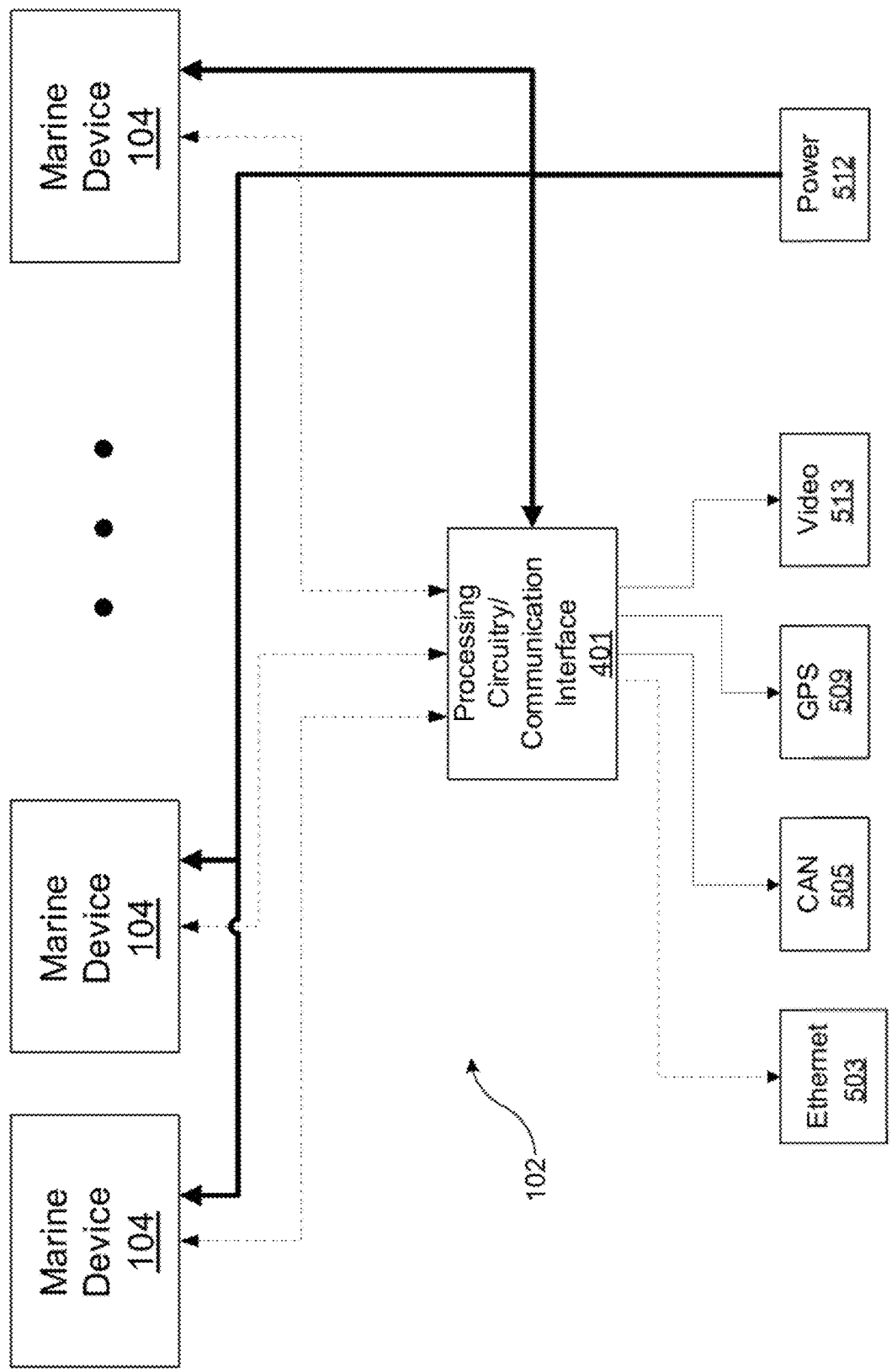
Figure 7:
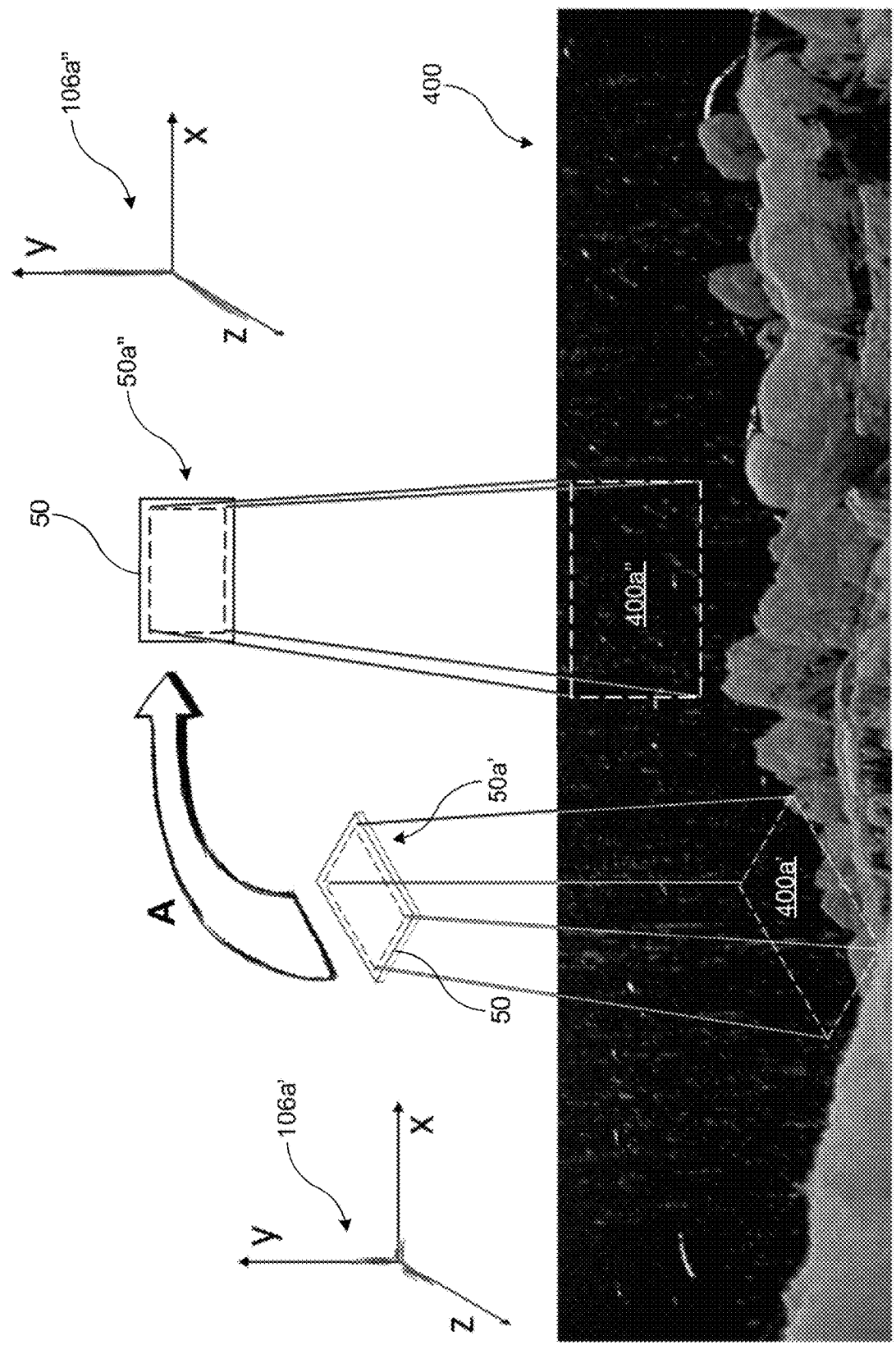
Figure 8:
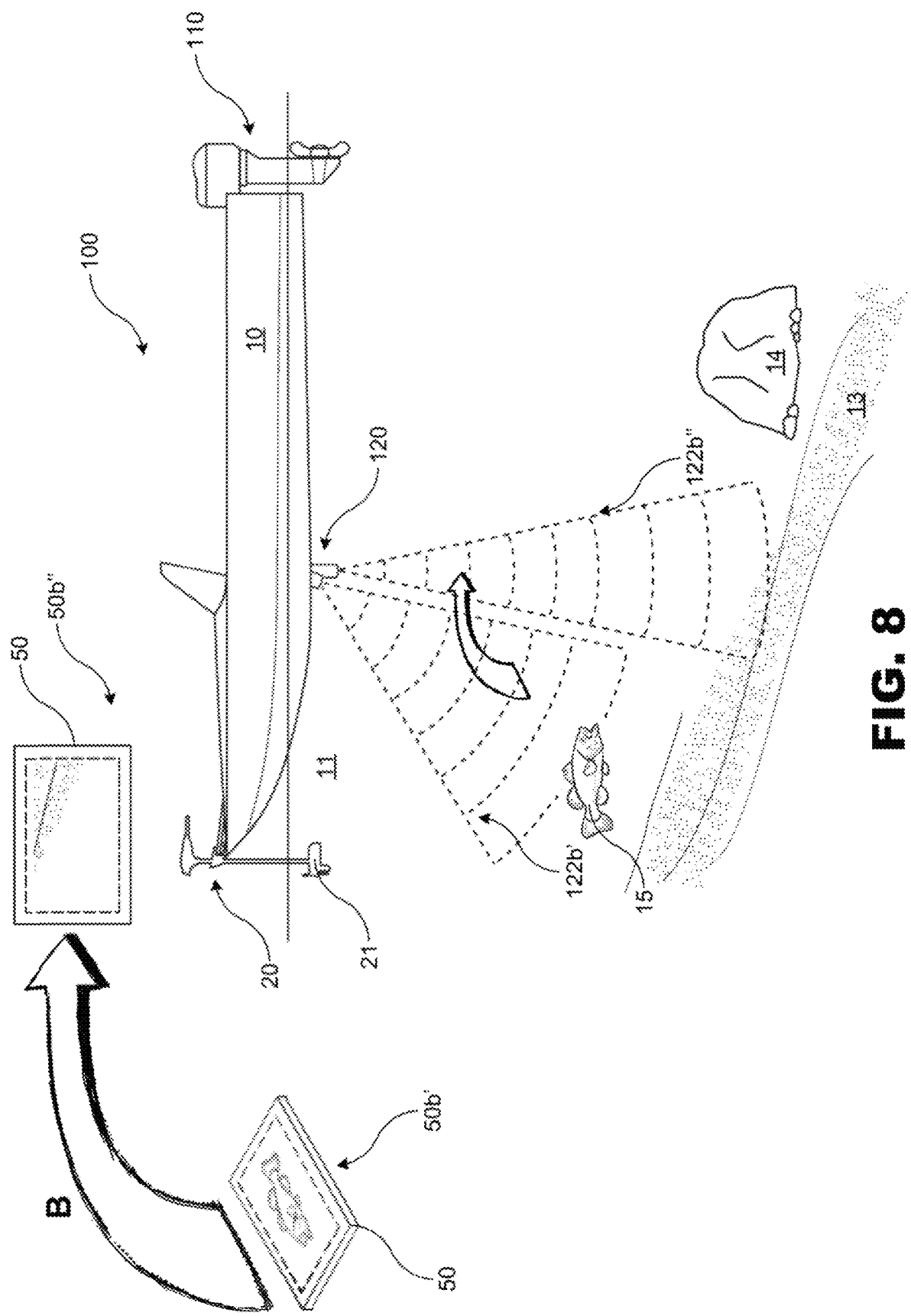
Figure 9:
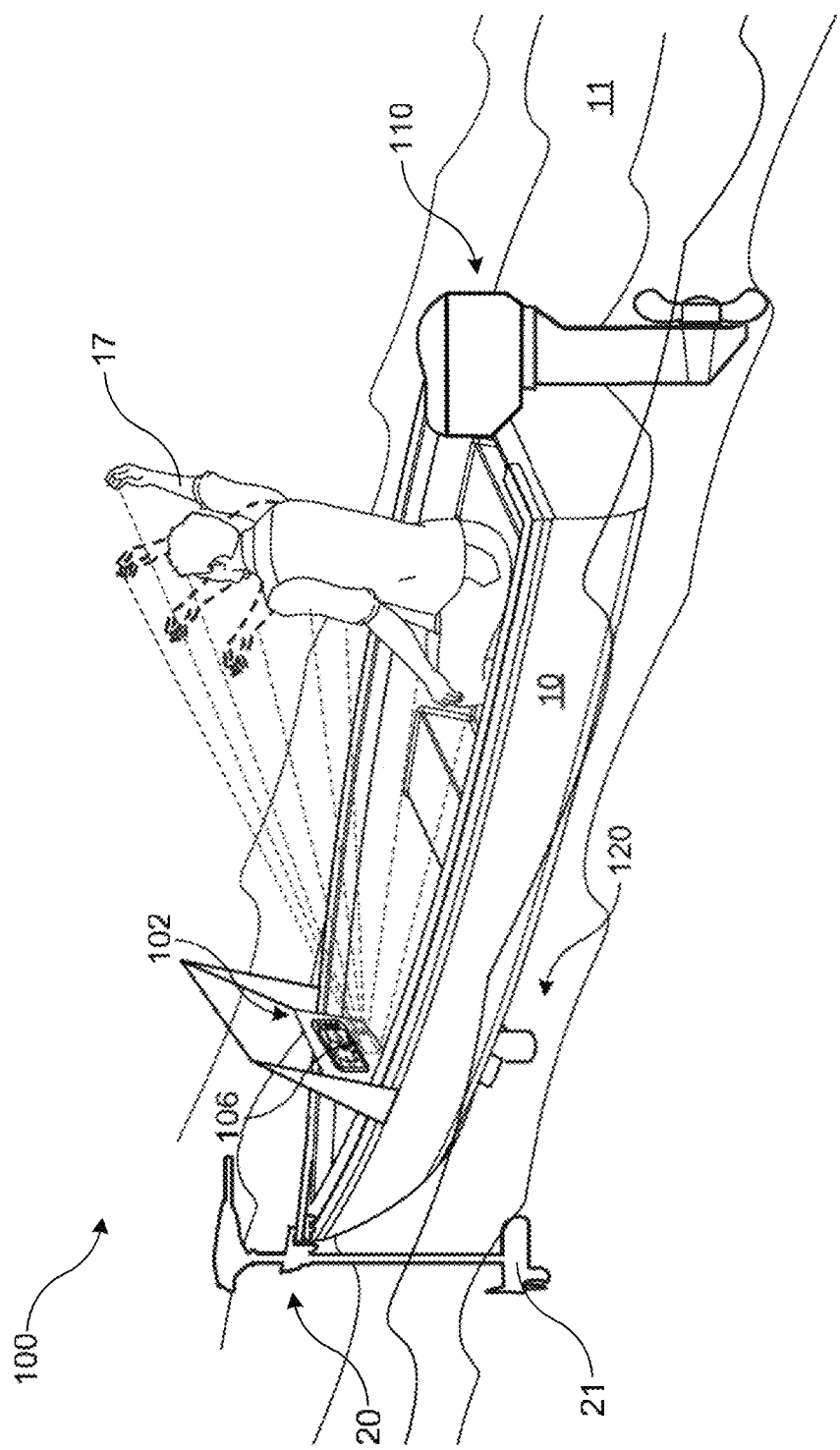
Figure 10:
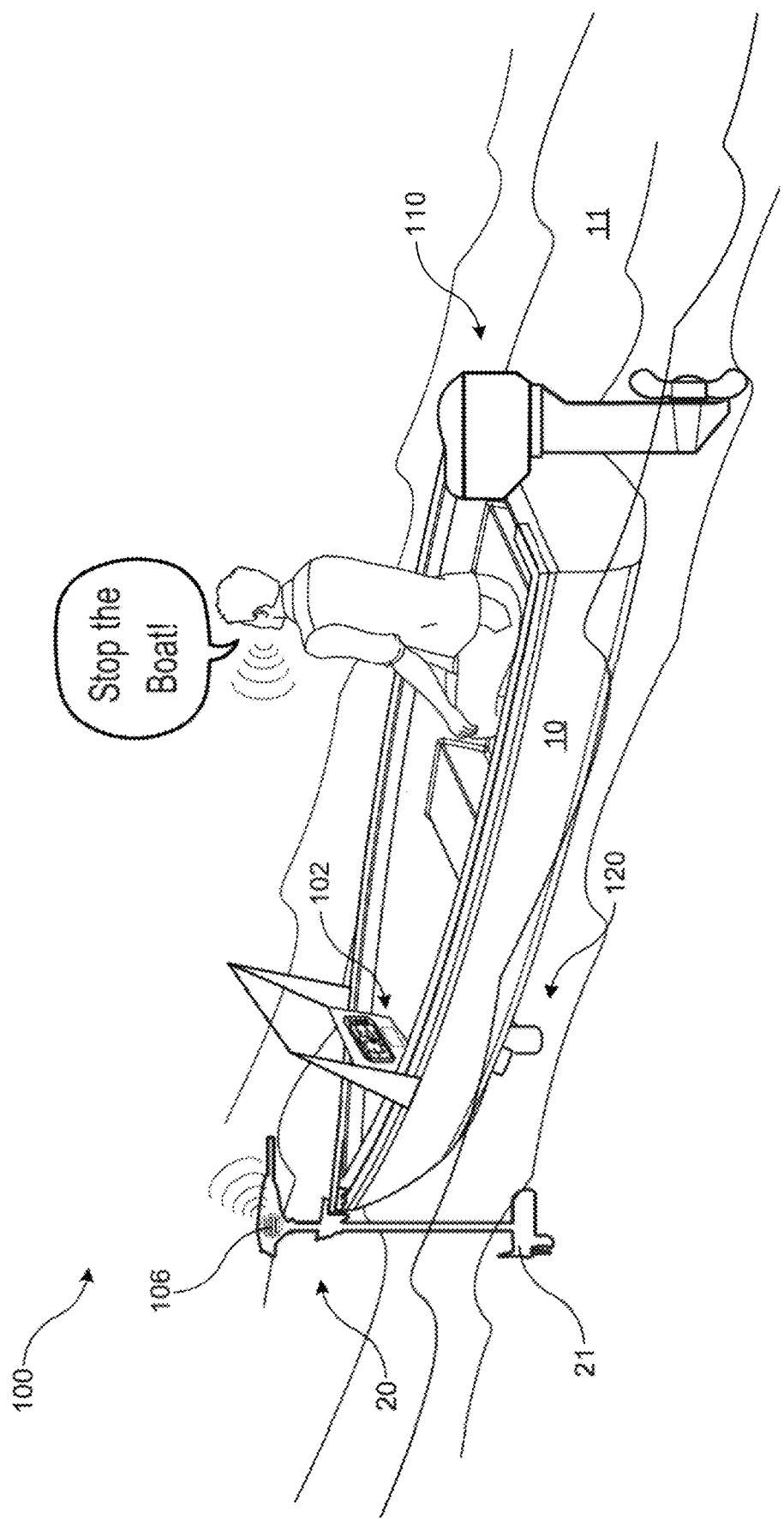
Figure 11:
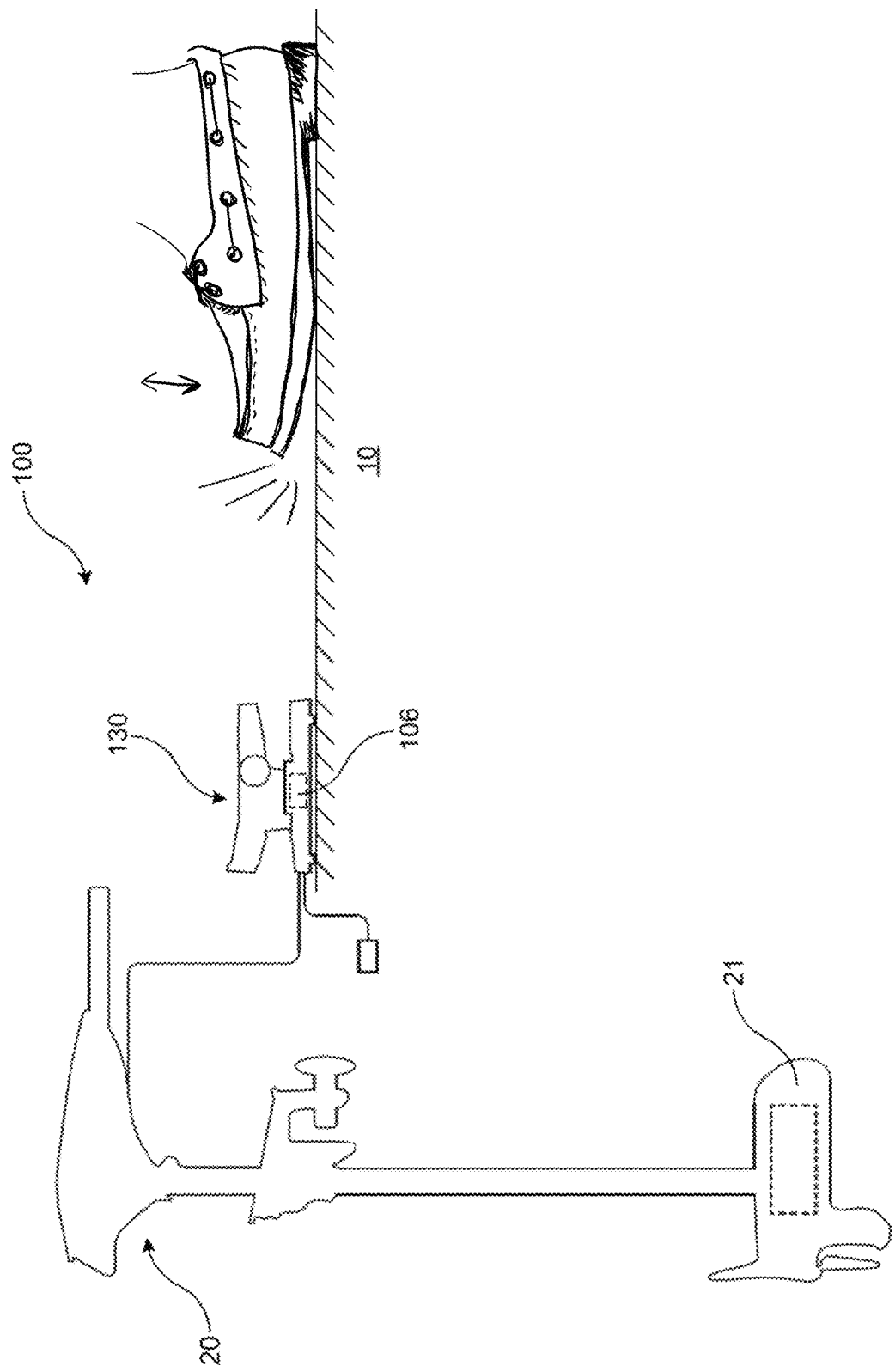
Figure 12:
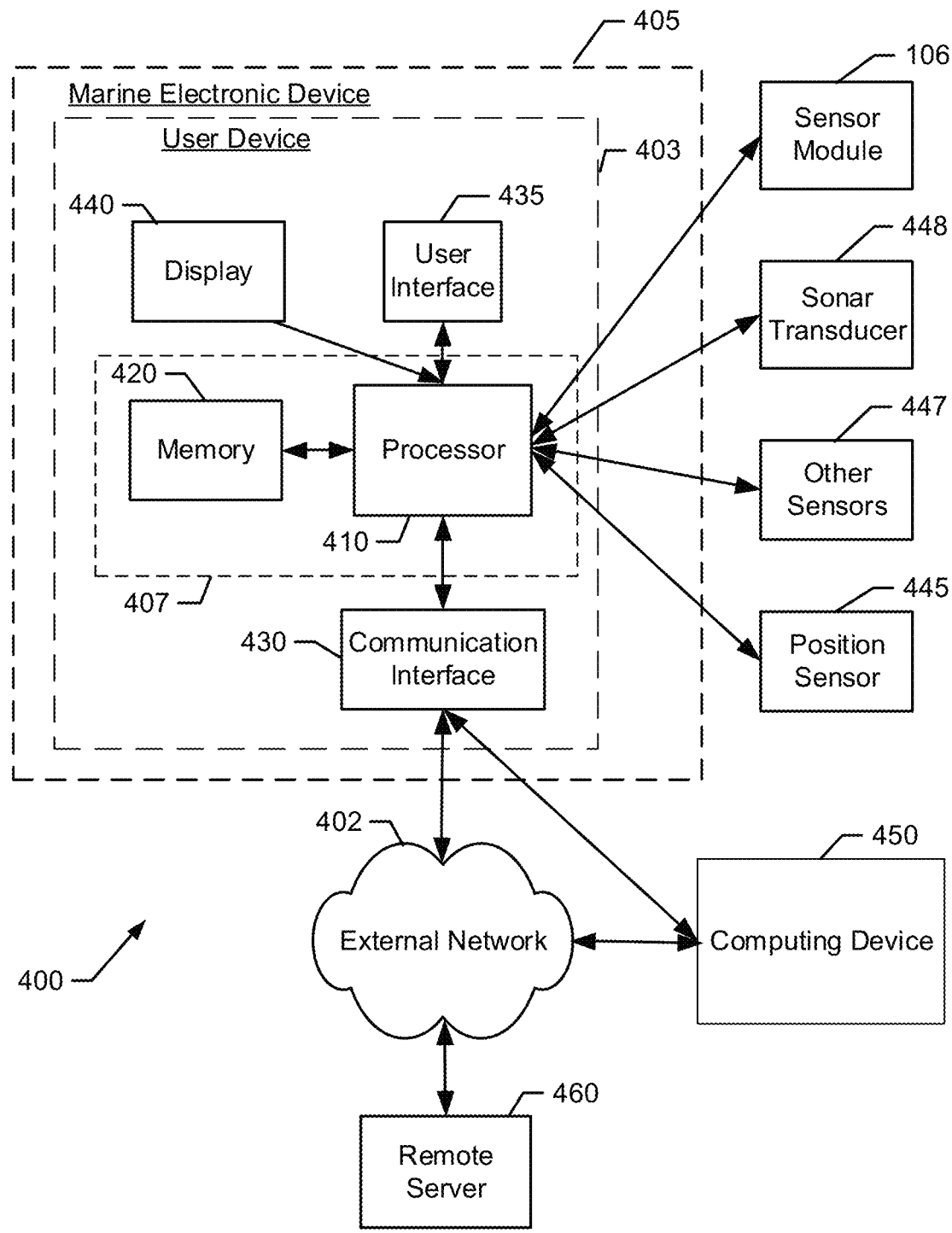
Figure 13:
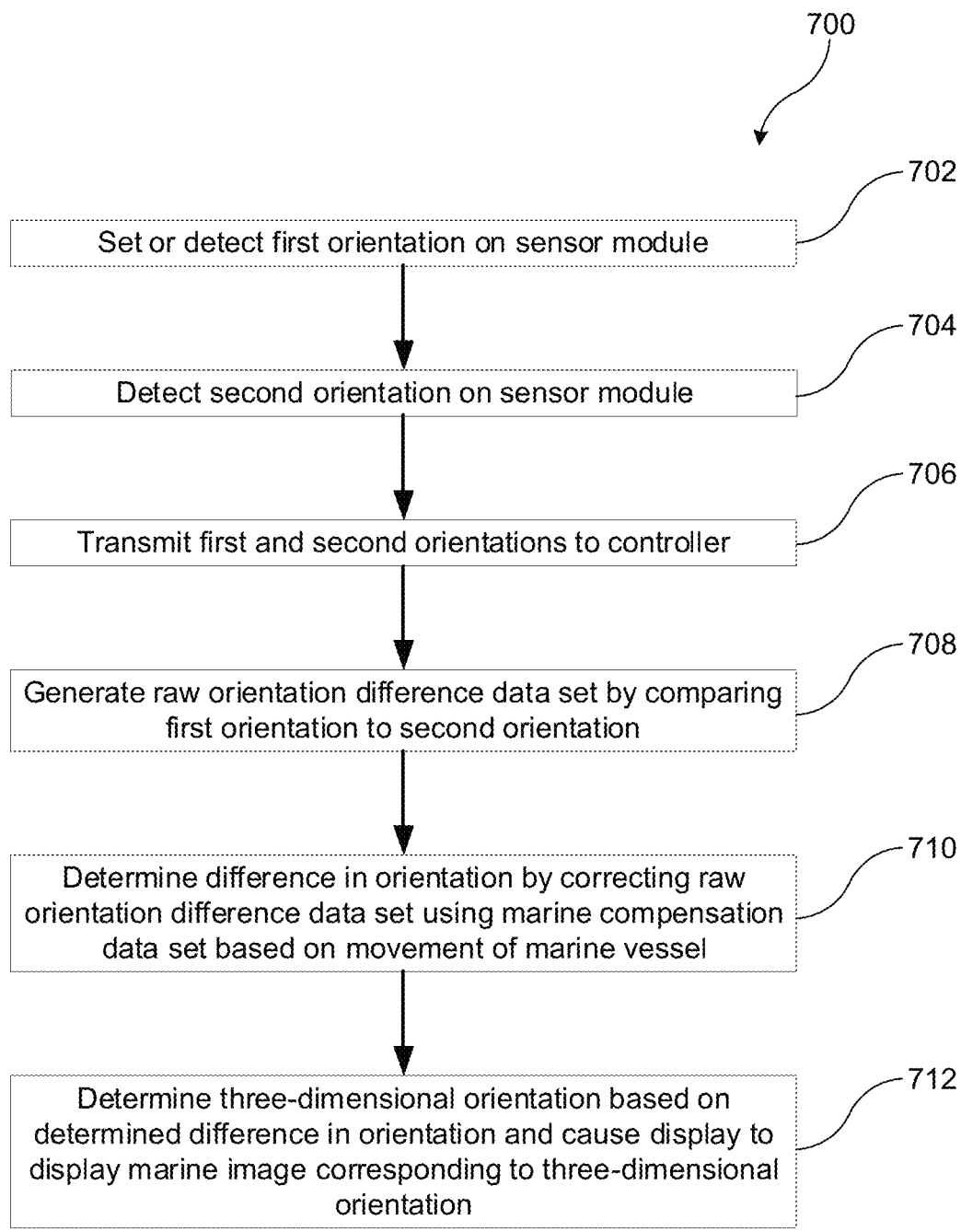
Figure 14:
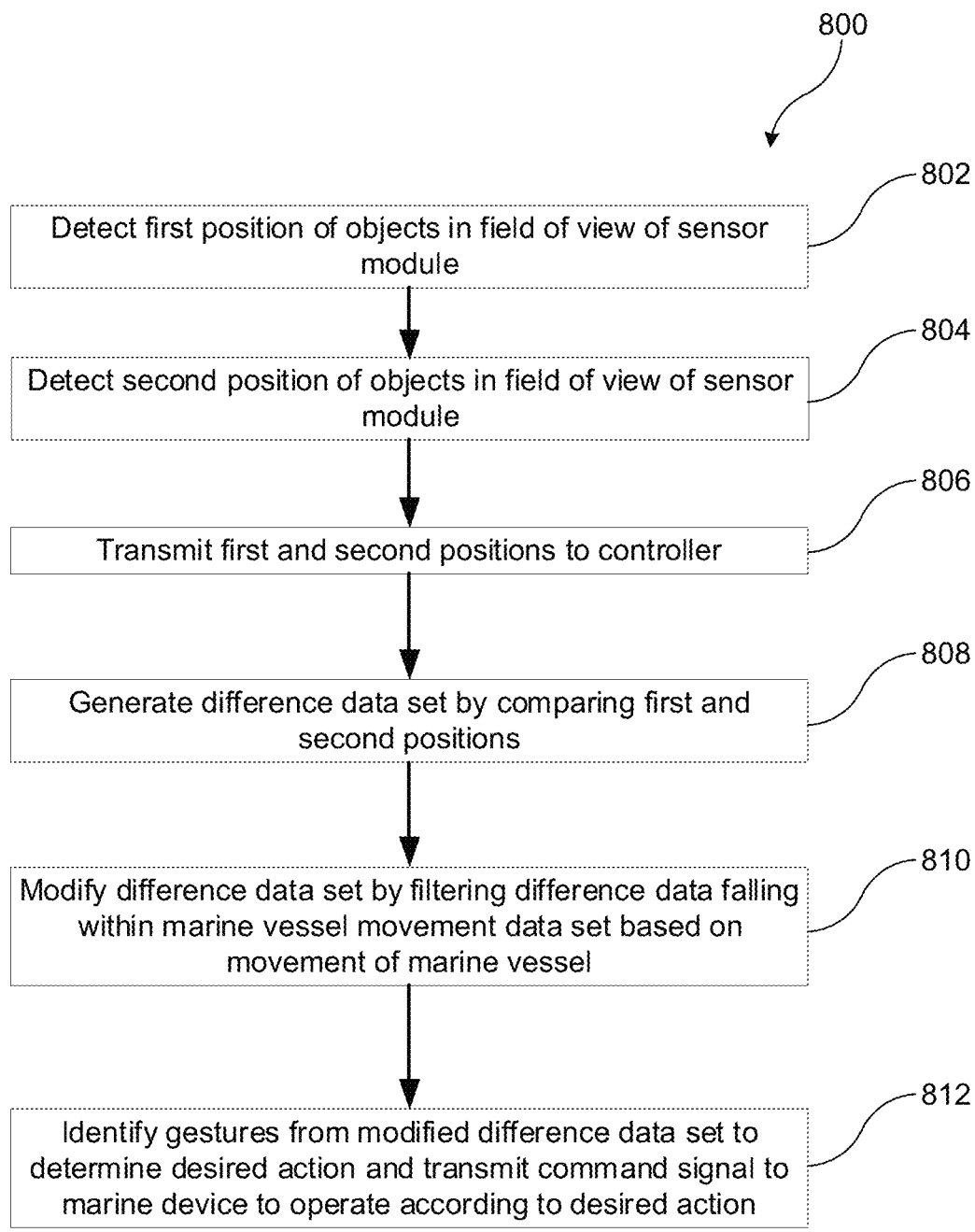
Figure 15:
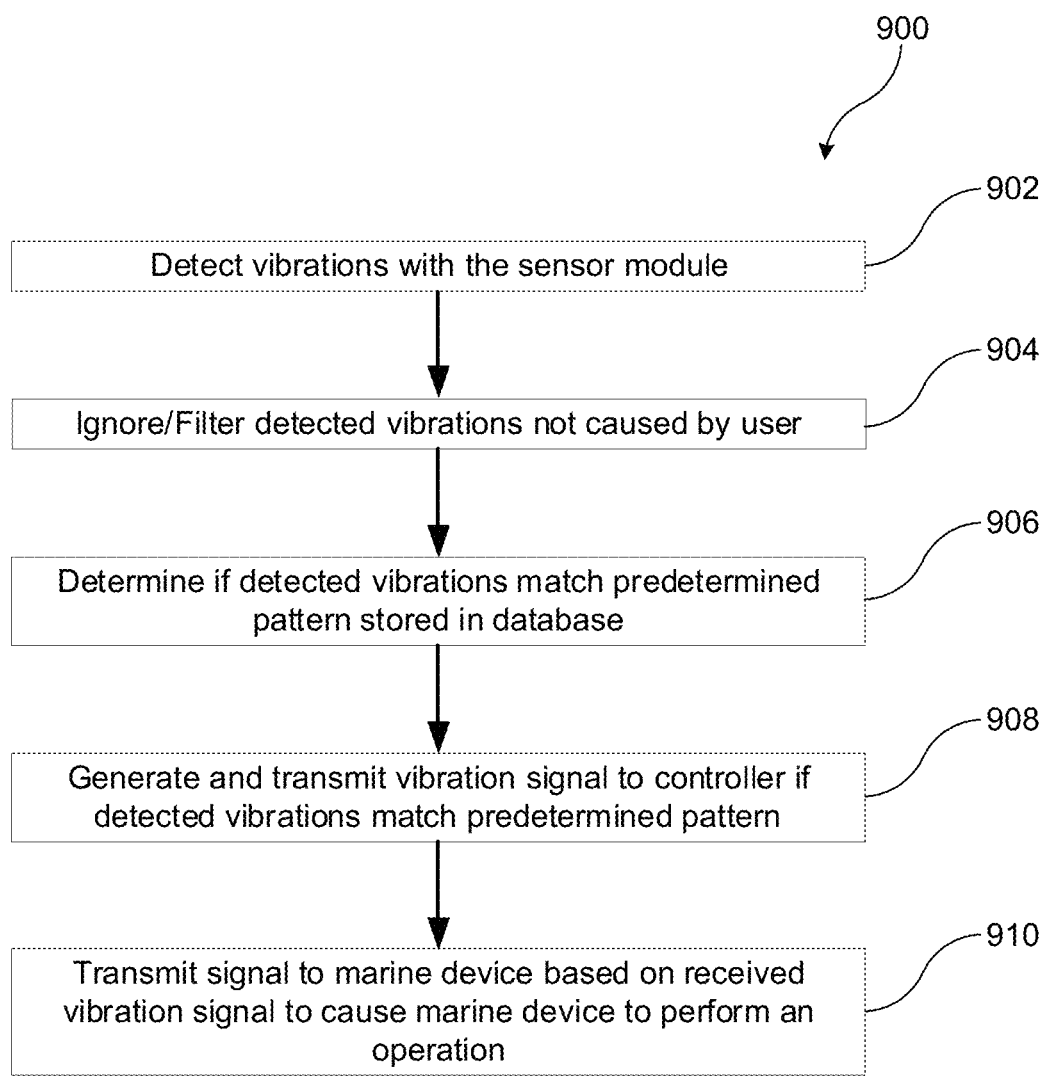

Having thus described embodiments of the present disclosure in general terms, reference will now be made to the accompanying drawings, which are not necessarily drawn to scale, and wherein:

FIG. 1 illustrates an example marine vessel with a propulsion system, sonar system, and trolling motor assembly attached, in accordance with some embodiments discussed herein;

FIG. 2 shows a block diagram of an example system with a controller, sensor module, and marine device, in accordance with some embodiments discussed herein;

FIG. 3 shows a block diagram of another example system with the sensor module built-in to a mobile media device, in accordance with some embodiments discussed herein;

FIG. 4 shows a diagram of an example system including a multi-function display and an integration hub connected with various marine devices, in accordance with some embodiments discussed herein;

FIG. 5 shows a diagram of another example system including an integration hub connected with various marine devices and displays, in accordance with some embodiments discussed herein;

FIG. 6 shows a diagram of an example controller including various communication interfaces in connection with multiple marine devices, in accordance with some embodiments discussed herein;

FIG. 7 shows an example sensor module built-in to a mobile media device for controlling visualizations of a sonar system, in accordance with some embodiments discussed herein;

FIG. 8 shows an example system for controlling the sonar view direction using a mobile media device, in accordance with some embodiments discussed herein;

FIG. 9 shows an example system for controlling marine devices using a view sensor, in accordance with some embodiments discussed herein;

FIG. 10 shows an example system for controlling marine devices using a vibration sensor, in accordance with some embodiments discussed herein;

FIG. 11 shows another example system for controlling marine devices using a vibration sensor located in a foot pedal, in accordance with some embodiments discussed herein;

FIG. 12 shows a block diagram illustrating an example system architecture, in accordance with some embodiments discussed herein;

FIG. 13 illustrates a flowchart of an example method for controlling a sonar system with an orientation sensor, in accordance with some embodiments discussed herein;

FIG. 14 illustrates a flowchart of an example method for controlling marine devices with a view sensor, in accordance with some embodiments discussed herein; and FIG. 15 illustrates a flowchart of an example method for controlling marine devices with a vibration sensor, in accordance with some embodiments discussed herein.

DETAILED DESCRIPTION

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

Embodiments of the present disclosure provide systems and methods for controlling operations of marine devices on a marine vessel (e.g., watercraft, boat, ship). Such example embodiments enable a user to activate various modes and set desired actions for connected marine devices, while letting the user maintain freedom of limbs and position on the marine vessel so as to not interfere with the user's boating activities and also accounting for specifics of the marine environment, such as motion of the watercraft while floating on the surface of the water. This provides advantages in convenience and time saving. For example, a user may not have to move to the helm to physically interact with a touchscreen and, thus, may more fully engage in other marine activities, for example.

EXAMPLE SYSTEMS OVERVIEW

FIG. 1 illustrates an example marine vessel 10 (e.g., a watercraft) on a body of water 11 in connection with various implementations described herein. An example system 100 may include a display 40 (e.g., multi-functional display (MFD) at the helm of the marine vessel 10), a user input assembly (e.g., mobile media device 50) for accepting user actions, and/or one or more marine devices (e.g., propulsion system 110 used for propulsion and/or steering, sonar system 120).

The marine vessel 10 may include a gasoline/diesel/electric outboard motor as part of the propulsion system 110. The marine vessel 10 may use one or more outboard motors, inboard motors, thrusters, jets, pods, trolling motors (e.g., trolling motor assembly 20), or any other type of marine motor or engine for propulsion. The motors may be operated manually or by autopilot units. An autopilot unit may control the direction and speed of the motor.

As shown in FIG. 1, the marine vessel 10 may include a trolling motor assembly 20 attached to its front as part of or in addition to the propulsion system 110, with a trolling motor 21 submerged in the body of water. The trolling motor 21 may be a gasoline, diesel, or electric motor. The trolling motor 21 may be quieter than the outboard motor. The trolling motor assembly 20 may be used for directional control and localized propulsion to cause the marine vessel 10 to travel along the surface of the water 11. The trolling motor assembly 20 may be used to propel and steer the marine vessel 10 while a fisherman is fishing. The trolling motor assembly 20 may be attached to either the bow or the stern of the marine vessel 10. While the depicted embodiment shows the trolling motor assembly 20 attached to the front of the marine vessel 10 and as a secondary propulsion system, example embodiments described herein contemplate that the trolling motor assembly 20 may be attached in any position on the marine vessel 10 and/or may be the primary propulsion system for the marine vessel 10. The trolling motor 21 may be raised out of the water when not in operation. For example, the trolling motor 21 may be raised while the outboard motor is being operated in order to reduce drag on the marine vessel 10.

In some embodiments, the system 100 may include a controller 102 (e.g., multi-functional display (MFD), processor, computer, marine electronics hub) onboard or otherwise associated with the marine vessel 10, as shown in the schematic diagram of FIG. 2. The controller 102 may be configured to control operations of one or more marine devices 104 (e.g., sonar system 120, propulsion system, 110, radar system, trolling motor assembly 20, marine display 40, anchor system, navigational system). The controller 102 may be in communication with one or more sensor modules 106 (e.g., via wired and/or wireless connections).

The sensor module 106 may transmit signals to the controller 102 indicating a detected condition, event, and/or user input. The sensor module 106 may include various sensors for detecting conditions, events, and/or user inputs. Some non-limiting examples of sensors that may be part of the sensor module 106 include tactile sensors (e.g., pressure sensors, strain gauges, capacitive touch sensors), three-axis sensors, analog sensors, vibration sensors, chemical sensors, electromagnetic sensors, environmental sensors, flow sensors, navigational sensors, position sensors, optical sensors, and temperature sensors. The sensor module 106 may be located anywhere relative to the marine vessel, such as within an MFD, mounted separately to the marine vessel, and/or within a mobile media device 50 (e.g., shown in FIG. 3).

Some non-limiting examples of user inputs include direction of user's face; direction or orientation of an FOB, a mobile media device 50, and/or a sensor module 106 located in the user's hand or worn on the user's body, adjustably or permanently mounted to marine vessel 10, chair, trolling motor assembly, and/or other marine device 104 thereon; pinch-zoom-pan or other touch; body or hand gestures; facial expressions/actions; sounds; and brainwaves.

In some embodiments, the controller 102 may have a two-way communication connection with the sensor module 106. For example, the controller 102 may transmit a request signal to the sensor module 106, and in response, the sensor module 106 may transmit a reply signal (e.g., indicating status, current detected condition) to the controller 102. In some embodiments, the controller 102 may transmit a control signal to the sensor module 106 indicating how the sensor module 106 should operate and/or what actions the sensor module 106 should take.

Likewise, in some embodiments, the controller 102 may have a two-way communication connection with the marine device 104. For example, the controller 102 may transmit a request signal to the marine device 104, and in response, the marine device 104 may transmit a reply signal (e.g., indicating status) to the controller 102. In some embodiments, the controller 102 may transmit a control signal to the marine device 104 indicating how the marine device 104 should operate and/or what actions the marine device 104 should take.

In some embodiments, the controller 102 may be an assembly or system of multiple processors and/or circuitry distributed across various devices. As such, actions taken by the controller 102 (e.g., determining, transmitting, receiving, generating, comparing) may each occur on different devices or using multiple components. For example, as shown in FIG. 3, the sensor module 106 may be built-in to a mobile media or smart device, which senses, processes, and/or interprets a user input locally to determine what signal to send to the remote MFD, built-in to the marine vessel 10, which then uses a communication bus or integration hub to transmit a control signal to the marine device 104, which may receive and then further process the data and/or signal. In some embodiments, the sensor module 106 may include a camera and/or other optical or visual sensor as well as a local dedicated image processor for rapidly analyzing data captured via the one or more sensors.

Many variations of the system 100 of the controller 102, marine device 104, and sensor module 106 are possible. For example, the controller 102 may be a processor built-in to the MFD of the marine vessel 10 and/or an integration hub 401 (which may be separate from or within the MFD), the sensor module 106 may be a remote device not onboard the marine vessel 10, and the marine device 104 may be a detachable trolling motor assembly mounted to the side of the marine vessel 10. In some embodiments, the controller 102, marine device 104, and/or sensor module 106 may be located within the same device or housing. For example, the controller 102 may be built-in to a trolling motor assembly for controlling the steering and propulsion of the trolling motor with the sensor module 106 (e.g., microphone, accelerometer, vibration sensor) positioned in the foot pedal, and the marine device 104 (e.g., display, navigation system, autopilot, GPS, sonar system, fish finder) may be included in the handle. Further example embodiments are disclosed herein.

The system 100 may include a marine device 104 coupled to a marine vessel 10. Example marine devices 104 are illustrated in FIGS. 4-6. In some embodiments, the marine device 104 may comprise a multi-functional display (MFD), a fish finder, a mapping device, a navigation device, a sailing device, an angler device, and/or various other devices used for marine based applications, for example. The marine device 104 may be configured for processing and/or displaying multiple types of marine data.

FIG. 4 shows an integration hub 401 and an MFD with multiple displays 40 as part of the controller 102 (in some embodiments, the integration hub may be a part of the MFD). The integration hub 401 may connect the controller 102 with various marine devices 104, such as the propulsion system 110, radar system, sonar system 120, GPS system 509, autopilot 507, remote control system, power system 512, and/or chart system, for example, as shown in FIG. 4.

FIG. 5 shows the integration hub 401 connected to various marine devices 104 sorted into groups according to function. Such groups may include a navigation system 104a (e.g., plotters, control displays, radar system, sonar system 120, autopilot 507, VHF/AIS, audio system, and/or other instrumentation), an auxiliary electric system 104b (e.g., interior/exterior/navigational lights, refrigerator, pump system), an onboard comfort system 104c (e.g., HVAC, water heater, anchor windlass, engine bay cover, fuel tank, fresh water tank, grey tank), an electric power system 104d (e.g., starter battery, board battery, battery charger, shore power, inverter, generator), and/or a steering/engine system 104e (e.g., throttle, trim tabs, steering wheel, engine), for example, as shown in FIG. 5.

FIG. 6 shows the integration hub 401 in connection with various marine devices 104 (e.g., power system 512) and various communication interfaces as part of the controller 102. The various communication interfaces may include communication systems (e.g., ethernet 503, controller area network (CAN) 505), a GPS system 509, and/or a video system 513, for example, as shown in FIG. 6.

Further, non-limiting examples of the one or more marine devices 104 include a propulsion system 110, engine, steering system, gas-powered or electric trolling motor assembly 20, outboard motor, inboard motor, fish finder, anchor system, lighting, radio, audio system, digital switching, displays, fuel system, etc.

Example Systems with Orientation Sensor Control

In some embodiments, the systems and methods disclosed herein may allow a user to control operations and display of marine data, such as sonar data, and various features. In some embodiments, the system 100 may provide control over marine displays and/or MFDs. In such embodiments, the display control may be more intuitive and natural while minimizing or even eliminating use of hands. In this way, required manual interactions with the MFD/display may be minimized, unless desired by the user.

The following provides an example orientation sensor control for controlling a sonar system. Notably, however, such orientation control may be implemented for any marine device. As shown in FIG. 1, the system 100 may include a sonar system 120 for detecting the underwater environment in multiple dimensions. The sonar system 120 may be built-in, attached to, and/or remote from the marine vessel 10. Visualizations of three-dimensional data from the sonar system 120 may be provided to the user via a display (e.g., marine display 40 at helm of marine vessel 10 in FIG. 1, display on user's mobile media device 50).

Many variations and combinations of the system 100 and methods to control the display/visualization/sonar are possible. Some non-limiting examples of components within the system 100 include a display (e.g., phone, tablet, VR headset, head-mounted mobile media device 50, heads-up display goggles, adjustable mount MFD, other viewer), sonar system (e.g., 3D sonar transducers with 360° scanning mounted below/on the marine vessel 10, 3D sonar transducers mounted to trolling motor assembly 20), downrigger, inverted periscope, handheld or wearable FOB (e.g., wrist-mounted), body gesture detection, and/or head orientation sensor (e.g., glasses frames, FOB).

The sonar system 120 may be part of or associated with a marine device 104. As such, the controller 102 may send signals to the sonar system 120 to control its operation in response to signals received from the sensor module 106. The sensor module 106 may include various sensors (e.g., touchscreen, touchpad, trackball, camera, orientation sensor, 3D laser, facial recognition sensor, facial expression or gesture recognition sensor, electroencephalography (EEG) sensor) configured to detect user inputs for controlling operation of the sonar system 120 and/or display via the controller 102. In some embodiments, the sensor module 106 may be positioned within or correspond with one or more devices/locations (e.g., MFD, handheld device or FOB, phone, tablet, computing device, adjustable device mount, VR headset, glasses frames or other headgear, trolling motor foot pedal or buttons, other user input assemblies). Some non-limiting examples of user inputs include direction of user's face; direction or orientation of FOB, mobile media device 50, and/or sensor module 106 in user's hand or worn on user's body, adjustably or permanently mounted to marine vessel 10, chair, trolling motor assembly, and/or other marine device 104 thereon; pinch-zoom-pan or other touch; and body or hand gestures.

Sonar (SOund Navigation And Ranging) may refer to using sound underwater to detect waterborne or submerged objects (e.g., seafloor, fish, lures, plants, rocks). For example, sonar devices may be used to determine depth and bottom topography, detect fish, locate wreckage, etc. Active sonar systems (e.g., using pinging) may emit pulses of sound waves and receive echoes. Sonar transducer elements, or simply transducers, may convert electrical energy into sound or vibrations at a particular frequency. Using sonar, a sound beam is transmitted into and through the water and is reflected from objects it encounters. The transducer may receive the reflected sound (the "sonar returns") and convert the sound energy into electrical energy. These sonar returns provide time data that represents the time taken by the sound wave to travel from the transducer to the object and return as sonar returns to the transducer. Using the time in combination with the known speed of sound, a distance to the location of each sonar return may be determined. The structure and objects present in the underwater environment may be resolved based on this distance data and provided as a detailed two- or three-dimensional image to the user. Echo measurements and characteristics for targets and objects may be determined using various acoustic frequencies (e.g., infrasonic, ultrasonic).

Example systems and methods that could be utilized with various embodiments of the present disclosure, such as for generating three-dimensional data using sonar or other systems, are described further in U.S. Pat. No. 10,061,025, entitled "Method and Apparatuses for Reconstructing a 3D Sonar Image", U.S. Pat. No. 10,114,119, entitled "Sonar Systems and Methods using Interferometry and/or Beamforming for 3D Imaging", U.S. Pat. No. 10,247,823, entitled "Sonar Rendering Systems and Associated Methods", U.S. Patent Publication No. 2017/0285167, entitled "Systems and Associated Methods for Producing a 3D Sonar Image", U.S. Patent Publication No. 2017/0371039, entitled "Presenting Objects in a Sonar Image of an Underwater Environment", and U.S. Patent Publication No. 2018/0329056, entitled "Devices and Methods for Locating and Visualizing Underwater Objects", which are all owned by the Assignee of the present application and incorporated herein by reference.

In some embodiments, the sonar system 120 may include, for example, a mechanically steered sonar assembly, a beam-steered sonar assembly, a frequency-steered sonar assembly, and/or a trolling motor pointed sonar assembly. The system 100 may use a sonar transducer positioned below the surface of the body of water 11, in which the marine vessel 10 is deployed. The sonar transducer may pointed in a forward (fore), rear (aft), starboard (right), port (left), or other direction relative to the bow of the marine vessel 10. The sonar transducer may be configured to provide various angular ranges of view in various directions, such as about a 90° vertical view along with about a 15° to 30° horizontal view, for example. The various angular ranges of view may include or at least be extended to include angular ranges of vertical views from/between about 0° to more than 90° along with angular ranges of horizontal views from/between about 0° to 180°, or in some cases, 360° view. The sonar transducer may be configured to manually or automatically rotate (or pivot or directionally adjust) vertically and/or horizontally so as to rotate the view (e.g., sonar view direction 122).

In various implementations, the sonar transducer may be referred to as a forward scanning sonar transducer having a forward spotlight scan transducer. In some embodiments, the sonar system 120 may include an array of multiple sonar transducers having one or more right forward scanning elements, left forward scanning elements, conical sonar elements, and/or bar downscan sonar elements. In such embodiments, the multiple sonar scanning elements may each capable of generating a separate sonar beam, each including a conical and/or linear beam projection. Further, each of the sonar beams may include a conical and/or linear downscan beam projection having a coverage area of a beam produced by a circular and/or linear downscan transducer. In some embodiments, each sonar transducer element may be configured to use sonar technology to evaluate attributes of various target objects by interpreting echoes from sound waves. Each sonar transducer element may be configured to actively generate low and/or high frequency sound waves and evaluate echoes received back to thereby measure time intervals between sending signals and receiving corresponding echoes to determine distance to target objects. Each sonar transducer element may be configured to convert energy into sound waves using piezoelectric transducers or capacitive transducers that are configured to convert electrical energy into sound. The sonar transducer elements may be configured to use piezoelectric crystals that change size when voltage is applied, whereby applying an alternating current (AC) across the piezoelectric crystals may cause oscillations at high frequencies for generating high frequency sound waves. In some instances, focusing sound waves generated by each sonar transducer element may be determined by an area and shape of each sonar transducer element, a sound wave frequency of each sonar transducer element, and/or a sound velocity of the propagation medium, such as a body of water. In some instances, the sonar transducer elements may use piezoelectric crystals configured as transceivers to transmit and detect sound waves in one or more elements, such as propagating sound waves and receiving echoing sound waves.

In some embodiments, the sonar system 120 may include one or more sensors. For example, the sensors may include a dedicated sensor (e.g., water sensor) configured to detect deployment in and/or removal from the body of water 11. The dedicated sensor may include electrode terminals configured to activate and/or deactivate the sonar system 120 when the marine vessel 10 based on the presence of water. Additionally, the sensors may include one or more environmental sensors, such as temperature and/or depth sensors, for example.

In some embodiments, the transducers of the sonar system 120 may be configured to rotate and/or pivot to provide multiple fields of horizontal views, such as 360° views along the horizontal (e.g., x-axis). These multiple fields of horizontal views may include forward (fore) facing views (e.g., facing toward a bow of a watercraft), rear (aft) facing views (e.g., facing toward a stern of a watercraft), starboard (right) facing views (e.g., facing toward a starboard side of a watercraft), and port (left) facing views (e.g., facing toward a port side of a watercraft). Further, the transducers may be configured to rotate and/or pivot to provide multiple fields of vertical views at various depths, such as angular views from 0° to 90° along the vertical (e.g., y-axis). In addition, the sonar system 120 may be configured to focus at and/or extend to different distances from the transducers.

During operation, the sonar system 120 may be configured to use sonar for imaging various environmental features (e.g., seafloor 13, rocks 14, fish 15, plants, lures, bait) in the body of water 11. This imaging may include mapping an underwater environment below the surface of the body of water 11 between the surface and a bottom or floor 13 of the body of water 11. For instance, this process may include various marine images of fish 15 or schools of fish captured beneath the marine vessel 10 by the sonar transducer pointed in any sonar view direction 122 with the sonar beam. In some implementations, the sonar system 120 may be configured to generate one or more two-dimensional (2D) and/or three-dimensional (3D) sonar images of the underwater environment in the sonar view direction 122.

In some embodiments, a display 40 may be coupled/mounted to the marine vessel 10 and used to display images associated with the sonar system 120 to provide marine images of the underwater environment in the sonar view direction 122. The controller 102 may include at least one processing component (e.g., processor) and memory including instructions configured to cause the processor to perform various actions and/or functions including display of images on the display 40 associated with the sonar system 120. The controller 102 may include various types of computing and/or display devices (e.g., marine display, marine electronics device, MFD, smart device). Further, the controller 102 may be configured to simultaneously display multiple images associated with the sonar system 120 on the display 40 in various display modes of operation (e.g., split screen mode).

In some embodiments, the user may select various modes for displaying the sonar imagery (e.g., color theme, historical, real-time, 2D, 3D). In addition to the display modes, in some embodiments, the user may select an auto-pointing mode (e.g., point at nearest fish or structure, into/away from current/wind, spin 360° like radar, scan desired area). The automatic pointing mode may be activated when the user is not using the sensor module 106 to manually control the pointing operations of the sonar system 120 via the controller 102. Mode or setting selections may be saved and stored in memory as a user profile for later access. Operating modes may be set to change over time. For example, the system 100 may be configured to point or orient the sonar to an initial home direction in response to a first command signal received (e.g., pinch-zoom-pan) and then automatically switched to a manual pointing mode using the sensor module 106 (e.g., VR headset, mobile media device 50). Switching between modes may be configured to be easily and conveniently accessible to the user (e.g., shortcuts on MFD, app, or smartwatch, toggle switches on sensor module 106, voice commands).

Non-limiting examples of various useful operating modes for the system 100 include (1) heads up head lock (e.g., when VR headset, display glasses, or head-mounted mobile media device 50 is in position on user's head, the sonar direction is locked to the movement of the user's head as sensed by the sensor module 106); (2) heads up FOB lock (e.g., when wearable FOB or mobile media device 50 is in position on user, the sonar direction is locked to the movement of the user's hand or wrist as sensed by the sensor module 106); (3) handheld device lock (e.g., when handheld FOB or mobile media device 50 is in position in user's hand, the sonar direction is locked to the movement of the device as sensed by the sensor module 106); (4) adjustable mount device lock (e.g., when FOB or mobile media device 50 is in position within an adjustable mount, the sonar direction is locked to the movement of the device as sensed by the sensor module 106 in response to adjusting the mount, steering the marine vessel 10, swiveling in a chair to which the mount is attached); (5) adjustable mount FOB lock (e.g., when sensor module 106 is in position on an adjustable mount, the sonar direction is locked to the pointing direction of a handheld or wrist-mounted FOB as sensed by the sensor module 106); (6) adjustable mount head lock (e.g., when sensor module 106 is in position on an adjustable mount, the sonar direction is locked to the movement of a head-mounted FOB as sensed by the sensor module 106); (7) pinch-zoom-pan (e.g., sonar direction is controlled by user's touch input as sensed by the sensor module 106); (8) trolling motor (e.g., sonar direction is pointed using the trolling motor assembly as sensed by the sensor module 106); (9) foot pedal (e.g., sonar direction is locked to the movement of a foot pedal as sensed by the sensor module 106); (10) auto-point at nearest fish/school/bait/lure (e.g., system 100 senses nearest fish/school/bait/lure and focuses beam); (11) auto-point at nearest structure (e.g., system 100 senses nearest structure and focuses beam); (12) auto-point into current (e.g., system 100 senses direction of current and points that direction or at a specified angle with respect to that direction); and (13) auto-point toward birds (e.g., system 100 senses nearest flock of birds and points that direction).

Example systems and methods that could be utilized with various embodiments of the present disclosure, such as for pointing, operating, or otherwise controlling sonar or radar systems, are described further in U.S. Pat. No. 10,324,175, entitled "Operating a Sonar Transducer", U.S. Patent Publication No. 2017/0038460, entitled "Wireless Sonar Receiver", U.S. Patent Publication No. 2018/0288990, entitled "Castable Sensor Device", U.S. Patent Publication No. 2019/0072951, entitled "Castable Sonar Devices and Operations in a Marine Environment", and U.S. Patent Publication No. 2019/0331779, entitled "Sonar Transducer having a Gyroscope", which are all owned by the Assignee of the present application and incorporated herein by reference.

The sensor module 106 may include a three-axis sensor or array of sensors (e.g., attitude and heading reference system (AHRS); magnetic, angular rate, and gravity (MARG) sensors; 3D accelerometers; solid-state, microelectromechanical systems (MEMS), and/or other gyroscopes; magnetometers; gimbals; compasses; altimeters; cameras; inertia sensors) that detects its orientation (e.g., rotational position, tilt, angle) in three-dimensional space with respect to the Earth based on gravity, etc. Based on the determined orientation captured by the sensor module 106, the controller 102 may cause the sonar system 120 to point the sonar view direction 122 to a corresponding angle.

In some embodiments, the user may adjustably mount or position a wearable device or FOB to a body part (e.g., wrist, hand, head, neck). The wearable device may be part of and/or in communication with the sensor module 106. In some embodiments, the wearable device may be configured to detect motion data using one or more accelerometers, gyroscopes, muscle activity sensors, and/or other types of motion sensors. In various implementations, the wearable device may be configured to use wireless technology, such as Bluetooth, Wi-Fi, cellular technology (such as GSM or CDMA), satellite communication, and/or any other type of wireless technology. In some instances, the wearable device may be wirelessly connected to the controller 102, sensor module 106, and/or mobile media device 50 via a network interface. In other instances, the wearable device may be wirelessly connected to any computer system via the network interface, including a portable computer system, a smart phone device, a remote computer, a remote server, a cloud server, and the like. Further, the wearable device may be connected to any computing device with a wired or wireless connection via the network interface.

In some embodiments, the sensor module 106 may be built-in to the user's mobile media device 50 (e.g., phone, tablet, laptop). In these embodiments, software (e.g., downloaded app, integrated application) may be included on the mobile media device 50 to facilitate communication between the sensor module 106 and the controller 102 of the marine vessel 10. For example, a VR fish finder feature may use the camera and orientation sensors of the mobile media device 50 to readjust the view to where the user has positioned the mobile media device 50.

In some embodiments, the display may be part of a mobile media device.

In some embodiments, both the display and the sensor module 106 may be built-in to the mobile media device 50. As shown in FIGS. 7-8, the sensor module 106 may transmit a signal to the controller 102 causing it to display a marine image (e.g., marine image 400) corresponding to the direction in which the user has oriented the sensor module 106 of the mobile media device 50. In this way, the viewing experience integrates onboard marine devices and mobile media or wearable devices, which may minimize any need to interact with the MFD or touchscreen. Further, in some embodiments, the system 100 may better utilize natural hand, body, and/or face gestures, allowing the user to understand and easily orient the direction of the sonar transducers while freeing the user's hands for fishing or boating activities.

The system 100 may make it easier for a user to understand or control static or scrolling sonar views (e.g., where the views are pointing, how to change the direction that the view is pointing when not pointing where the user wants). For example, active pointing of sonar (e.g., pointable transducers on trolling motor assemblies) may be enhanced using several techniques described herein, which may include allowing the user to control operations using more intuitive actions (e.g., pointing user's head, hands, and/or device). In some embodiments, advancing pointing technologies may enable active pointing of sonar view directions. For example, FIG. 7 shows an example diagram of the mobile media device 50 changing orientation. The three-axis sensor of the sensor module 106 detects the rotation of the mobile media device 50 across each of the three axes (e.g., x, y, z). Based on scanning data, the sonar system 120 may generate 3D marine imagery mapping out the detected underwater environment across the entire viewable range (e.g., potentially a 600 ft. half sphere extending in all directions below the water's surface, if not cutoff at the bottom by a detected seafloor or river bed). In some embodiments, the controller 102 may cause the display to depict a section of the marine image 400 corresponding to the detected orientation of the mobile media device 50 via the three-axis sensor of the sensor module 106. For example, as illustrated in FIG. 7, with the mobile media device 50 shown in a first orientation 50a', the sensor module 106 may detect the first orientation 50a' as indicated along the three axes 106a' and cause the appropriate section 400a' of the marine image 400 to be displayed. However, when the mobile media device 50 changes to a second orientation 50a" (e.g., along arrow A in FIG. 7), the sensor module 106 may detect the second orientation 50a" as indicated along the three axes 106a" and cause the appropriate section 400a" of the marine image 400 to be displayed. In this way, the user may perceive the mobile media device 50 as pointing the sonar view direction 122 of the sonar system 120, although the sonar view direction 122 may be continually rotating or scanning in order to produce the updated marine image (e.g., 2D marine imagery), for example. In some embodiments, the system 100 may have saved the marine image (e.g., 2D marine imagery) to memory, and as such, the required processing of the controller 102 may be lessened. In some embodiments, the stored marine image (e.g., 2D marine imagery) may be transferred to the mobile media device 50 such that the user may view the marine image (e.g., 2D marine imagery) at a later time.

In some embodiments, the system 100 may use compasses or other directional sensors to sync the orientation of the marine vessel 10 and/or sonar view direction 122 with the orientation of the mobile media device 50. For example, the MFD of the marine vessel 10 may provide the user with an initial set up screen to ensure that both the compass of the marine vessel 10 and the compass of the mobile media device 50 detect North in the same direction. Other syncing scenarios or systems are possible. In some embodiments, the system 100 may have the user orient the mobile media device 50 at a specific position on the marine vessel 10 and indicate when the mobile media device 50 is in this home position. In this way, the mobile media device 50 may utilize built-in sensors to detect changes in orientation relative to the marine vessel 10 and indicate the same to the sensor module 106 and/or controller 102. In some embodiments, initial syncing may be performed in the background. The synchronization feature of the system 100 may advantageously allow the user to view sonar images corresponding to the direction the mobile media device 50 is facing in real-time in an intuitive manner. This convenient correlation may enhance or improve boating activities, such as fishing, diving, etc.

In some embodiments, the system 100 may filter out unintended motion detected by the sensor module 106. For example, the system 100 may include one or more motion sensors (which may be part of the sensor module 106) for detecting the movement and/or orientation of the marine vessel 10 in the body of water 11 relative to the Earth caused by waves, wind, propulsion, weight-shifting, etc. This motion of the marine vessel 10 may cause corresponding motion of the user and/or mobile media device 50, which may be detected as a change in orientation by the sensor module 106. In order to prevent unintended changes to the sonar view direction 122 and/or display of sonar images in response to unintentional orientation changes detected by the sensor module 106, the controller 102 may track the motion data of the marine vessel 10 and apply one or more filters to the change in orientation data from the sensor module 106 to correct for orientation changes caused by the marine vessel 10 versus orientation changes intended by the user.

FIG. 8 shows another example diagram of the mobile media device 50 changing orientation (e.g., along arrow B). The sensor module 106 detects the rotation of the mobile media device 50 and transmits the associated motion data to the controller 102. In response, the controller 102 may send a signal to the sonar system 120 indicating that the transducers should rotate and/or pivot the sonar view direction 122 along the horizontal/vertical (x/y axes) in accordance with the detected orientation changes. Further, changes to the z-axis orientation of the sensor module 106 may be communicated to the sonar system 120 as changes to be made to the focal length or distance. Changes to the focal distance or extent may also be indicated by the user in other manners, such as by pinching to zoom on the screen of the mobile media device 50, for example. Moreover, the controller 102 may cause the display of the mobile media device 50 to depict marine images corresponding to the sonar view direction 122. For example, as shown in FIG. 8, the display on the mobile media device 50 may show the fish 15 when pointed in a first orientation 50b' (e.g., corresponding to sonar view direction 122b') and the seafloor 13 when pointed in a second orientation 50b" (e.g., corresponding to the sonar view direction 122b"). In this way, the user may intuitively connect the direction in which the mobile media device 50 is pointing as the same as the sonar view direction 122 of the sonar system 120. As described herein, the controller 102 may filter out orientation changes of the sensor module 106 that can be attributed to the motion of the marine vessel 10. In this way, the user may experience a stable view of the sonar in the intended direction without any extraneous motion.

In some embodiments, the mobile media device 50 may be configured to be positioned within an adjustable mount attached to a swiveling chair on the marine vessel 10. In this way, the sensor module 106 may detect motion of the chair via the mount, and the user may maintain visibility of the display screen while swiveling and fishing, for example. In such embodiments, the adjustable mount may include a quick stowage feature (e.g., hot-button or voice-activated) for storing the mobile media device 50 out of the way when catching a fish, for example.

In some embodiments, the mobile media device 50 may be configured to be positioned within an adjustable mount wearable around the user's neck in a hands-free manner. In this way, the sensor module 106 may detect motion of the user's body via the mount, and the user may maintain visibility of the display screen while moving and fishing, for example. In such embodiments, the adjustable mount may include a quick release feature (e.g., hot-button or voice-activated) to enable storing the mobile media device 50 out of the way when catching a fish, for example.

Example systems and methods that could be utilized with various embodiments of the present disclosure, such as for connecting to and/or mirroring a mobile media or other smart device, are described further in U.S. Pat. No. 10,311,715, entitled "Smart Device Mirroring", owned by the Assignee of the present application and incorporated herein by reference.

In some embodiments, the display may be a VR display, in which three-dimensional generated marine images are displayed. In some embodiments, the VR display may be a VR headset or glasses configured to be worn on the user's head. These embodiments may allow the user to easily reorient the sonar view using natural head gestures and body rotation. In some embodiments, the VR headset may include a mobile media device mounted inside a wearable housing. In this way, the VR fish finder feature may allow the user to see underwater with sonar as if scuba diving, thereby providing an immersive VR experience (e.g., similar to a diving experience including fish swimming by). This example system 100 may allow a user to look up, down, and around while holding a display or wearing a VR headset and to see corresponding marine images, representative of the generated underwater environment in those directions. The VR display may advantageously reduce or eliminate any need for other sonar system displays.

Alternatively or in addition to VR displays, some embodiments may include augmented reality (AR) displays. Example augmented reality systems and methods that could be utilized with various embodiments of the present disclosure, such as for displaying overlaid sonar and radar data on top of an unaltered view, are described further in U.S. Pat. No. 9,201,142, entitled "Sonar and Radar Display", owned by the Assignee of the present application and incorporated herein by reference.

While described as controlling a sonar system, the system 100 of the controller 102 and sensor module 106 may control any marine device 104. For example, the three-axis orientation sensor of the sensor module 106 may be configured to control the movement and/or orientation of any marine device 104 (e.g., rotatable radar system, trolling motor assembly 20, propulsion system 110, remote device, drone). In some embodiments, steering of the marine vessel 10 via the trolling motor assembly 20 and/or propulsion system 110 may be accomplished using the orientation sensor of the sensor module 106.

In some embodiments, the orientation sensor of the sensor module 106 may be configured to control the virtual orientation of an object (e.g., marine vessel) on a display. For example, when viewing live 3D modes of a sonar scan or navigation, the display may show a virtual depiction of the marine vessel 10 or other object in a virtual environment. The three-dimensional orientation sensor of the sensor module 106 may be configured to automatically re-orient the display of the virtual object according to the detected orientation. Thus, a handheld device may conveniently represent the real world version of the virtual object depicted on screen and may easily and understandably be manipulated by the user.

In some embodiments, the orientation sensor of the sensor module 106 may be built-in or connected to the user's smartwatch. The controller 102 may use the orientation and/or motion of the user's smartwatch to cause the display (e.g., MFD) to show or change the view of a marine image (e.g., marine image 400). For example, the user could rotate and/or gesture with the smartwatch to cause the display to pan up, down, left, and/or right. In some embodiments, the smartwatch's orientation sensor may be used to control other marine devices 104. For example, the controller 102 may use the data output from the orientation sensor of the smartwatch to conveniently steer and/or control a trolling motor.

The system 100 may include a machine learning algorithm for detecting when gestures and/or orientation changes of the smartwatch are unintended by the user to command the controller 102. For example, in addition to tracking the motion of the marine vessel 10, the controller 102 may be configured to recognize if a user is casting, catching a fish, and/or performing other onboard activities. In some embodiments, the system 100 may include a time and/or processing delay to prevent unintended gestures from causing the controller 102 to take actions. In response to detection of an unintended command gesture, the system 100 may be configured to pause or stop the detection and/or processing of orientation changes of the smartwatch by the orientation sensor of the sensor module 106 (e.g., until after a specified time delay, until the end of the recognized action is detected, or until the user signals the system 100 to resume detection and/or processing). In some embodiments, the system 100 may be further configured to log the time, location, type, etc. of the recognized non-command gesture, action, activity, and/or event (e.g., such as by recording waypoints or other data).

Alternatively or additionally, the smartwatch may include a touchscreen and software programming configured to enable the user to tap and/or perform user touch-based gestures on the smartwatch touchscreen to send commands to the controller 102 (e.g., via direct connection and/or through the mobile media device 50). In such embodiments, the smartwatch software programming may be configured to display a selectable "pause/resume" toggle button, such that the user may start and stop the detection of orientation and/or motion of the smartwatch by the sensor module 106.

Example Systems with View Sensor Control

In some embodiments, the systems and methods disclosed herein may use motion sensing within a field of view to control the operations of various marine devices 104.

As shown in FIG. 9, the sensor module 106 may include a motion sensor (e.g., radar-based motion sensor, camera sensor) for automatically detecting and/or capturing motion (e.g., gestures, hand signs, actions) of the user and/or one or more objects within a field of view of the motion sensor. In this way, a user may utilize the motion sensor as part of a user input assembly such that the system 100 may interpret the user's motions (e.g., gestures) as a user input (e.g., similar to a button or screen selection) without requiring the user to physically touch or contact anything directly. Thus, various marine devices 104 may be controlled in a touchless manner, freeing users to utilize their hands for other tasks and/or preventing unwanted contact of button panels or touchscreens, such as when environmental factors (e.g., erratic marine vessel movement, oils, sunscreen, fish, water, gloves) would cause buttons or touchscreens to be more difficult to control, for example.

In some embodiments, the motion sensor may be a camera sensor (e.g., 2D, 3D, optical, infrared (IR), radio frequency (RF), depth sensing, liquid lens). In some embodiments, the sensor module 106 may include image capture components (e.g., 2D/3D video camera, infrared (IR) or radio frequency (RF) depth-sensing camera). The image capture components may be configured to track the orientation and/or motion of a user's body (e.g., head, face, arms, front) and/or a FOB (e.g., wearable device) with respect to the marine vessel 10.

In some embodiments, the view sensor of the sensor module 106 may detect the face of a user. For example, the system 100 may include a facial (or eye) recognition/ expression detection mode (e.g., when the sensor module 106 is in position on an adjustable mount, the sonar view direction 122 may be controlled by the user's facial expressions/actions as sensed by the sensor module 106). The user may control other marine devices 104 using facial expressions/actions (e.g., winking, eyebrow raise). In some embodiments, the system 100 may utilize facial recognition to track the face of a particular user and ignore other passengers on the marine vessel 10. In this way, the system 100 may provide security over operational control of the marine vessel 10 and associated devices.

In some embodiments, the view sensor of the sensor module 106 may detect an orientation of one or more objects within the field of view. Based on the determined orientation captured by the sensor module 106, the controller 102 may cause a marine device 104 to operate in accordance with the detected orientation. For example, the marine device 104 may be a sonar system 120 such that the detected orientation of the object causes the controller 102 to point the sonar view direction 122 to an angle corresponding to the detected orientation. In such embodiments, the system 100 may include various useful operating modes, such as a 3D laser mode (e.g., when sensor module 106 is in position on an adjustable mount, the sonar view direction 122 is locked to the user's body gestures as sensed by the sensor module 106), for example.

In some embodiments, the motion sensor of the sensor module 106 may be a radar-based motion sensor. For example, as shown in FIG. 9, the sensor module 106 may detect the user raising or lowering an arm 17 using radar. These user actions (e.g., raising/lowering an arm) may be processed by the controller 102 to analyze whether the detected actions match any programmed actions stored in a database. In some embodiments, the user may customize the database to program the system 100 to take certain actions when a specific gesture is detected. If a gesture is detected, the controller 102 may cause the associated action to occur in one or more marine devices 104. For example, the system 100 may be configured to cause the appropriate marine device(s) 104 (e.g., propulsion system 110, anchor system, navigation system) to maintain the marine device 104 at the location detected when the user's arm was raised. The associated action caused in response to the detected gesture may differ depending on the conditions. For example, if the marine vessel 10 is travelling fast, the system 100 may first reverse the propeller direction of the propulsion system 110 to slow down and then cause the anchor to drop when the sensor module 106 detects that the user's arm is raised. Whereas, if the marine vessel 10 is travelling slowly or stopped, the system 100 may simply cause the anchor to drop when the sensor module 106 detects that the user's arm is raised. In this way, the system 100 may be adaptably programmed to utilize one or more appropriate marine devices 104 depending on multiple dynamic factors in response to one detected user gesture in order to bring about the user's desired action.

The controller 102 may signal the one or more marine devices 104 differently based on the location of the marine vessel 10. The location data may be recorded using a Global Positioning System (GPS). The GPS may be located in a marine device 104, or located on the marine vessel 10 and connected to the marine device 104. The location data may describe the approximate position of the marine vessel 10, mobile media device 50, and/or user.

Likewise, the controller 102 may signal the one or more marine devices 104 differently based on the current weather and/or environmental conditions surrounding the marine vessel 10. The current weather and/or environmental conditions may be provided by other sensors and/or network connections.

In some embodiments, the system 100 may record and/or store data captured by the view sensor of the sensor module 106. For example, the sensor module 106 and/or controller 102 may receive motion capture data recorded during a fishing trip. The motion capture data may be recorded using the radar-based motion sensor. The motion capture data may include motions performed by a fisherman during a fishing trip, such as casting, making catches, or any other motions performed by the fisherman during the fishing trip.

In some embodiments, the system 100 may utilize fuzzy logic, machine learning, or other technologies for automatic recognition of objects in the field of view of the motion sensor and/or to identify gestures or patterns of motion. For example, a user may signal to the system 100 via the sensor module 106 to take a three-dimensional scan of a fish, take a picture, capture a video recording, etc.

The controller 102 may be configured to receive one or more user inputs via the sensor module 106. The user inputs may include a desired operating speed, for example. In response, the controller 102 may send a command signal to the propulsion system 110 to operate at a desired speed.

In some embodiments, the user inputs may indicate a selected mode for operating the marine devices 104 and/or MFD. The selected mode may be selected by the user based on a plurality of modes of operation available for the various marine devices 104 and/or MFD. In some embodiments, the available modes may include a normal mode, an eco-mode, non-optimized modes (e.g., turbo mode, sport mode), optimized modes (e.g., partial-eco-mode, smart mode), and other intermediate modes, such as for the propulsion system 110, for example.

In some embodiments, the system 100 may include triggers for enabling and/or disabling the detection of motion using the motion sensor. For example, the user may toggle a motion detection mode via a local or remote button, touchscreen, and/or other input sensor. In this way, the user may control when motion and/or gesture detection for controlling the operation of marine devices 104 is turned on or off. In some embodiments, enabling the motion detection mode may be temporary, such as for only a preselected time window. For example, in response to the system 100 detecting a command word or phrase spoken by the user (e.g., "Alright, boat"), the view sensor of the sensor module 106 may be activated for a preselected detection time (e.g., about 60 seconds) to detect motion and/or gestures of the user. Other triggers are possible. Some non-limiting examples of triggers include selecting a mechanical or virtual button on a smartwatch, FOB, and/or other wearable device; executing a programmed "wake-up" sequence or pattern by snapping fingers, tapping on boat or other surface; and/or performing a customized gesture or action selected by the user.

The controller 102 may include a fuzzy controller. In some embodiments, the fuzzy controller may determine the appropriate interpretation of a detected action, such as based on a database. In some embodiments, the detected action may be converted to a fuzzy set. The conversion to a fuzzy set may be based on the nearness or degree of membership of the value of the detected action to one of a predetermined number of fuzzy sets. For example, the fuzzy controller may determine that a difference in arm position of 47° from lower to higher should be considered an arm raise, while a 36° change should be considered a hand point, depending on the fuzzy logic rules set up. In this way, the continuum of detected user actions can be broken down into a predetermined group of discrete commands. In some embodiments, the fuzzy sets may be predetermined and stored in the memory. Additionally or alternatively, in some embodiments, the fuzzy sets may be determined by the controller 102, such as dynamically and/or based on various factors (e.g., user position, MFD mode, etc.).

In some embodiments, the system 100 may be configured to temporarily interrupt an operation of the marine devices 104. For example, to avoid dispersing fish, the user may wish to quickly turn off the propulsion system 110 and/or other sound. The system 100 may be configured to track a user's actions (e.g., placing a finger to lips to indicate shushing) to enable the propulsion system 110 and/or audio system operation to be disrupted in order to maintain silence for as long as the user continues the action.

In some embodiments, the system may include one or more sensors, such as three-axis sensors (e.g., 3D accelerometer, gyroscope, gimbal, compass, altimeter), for detecting the movement and/or orientation (e.g., rotational position, tilt, angle) of the marine vessel in three-dimensional space with respect to the Earth based on gravity, etc. The sensors may aid in filtering out false positive detections of motion due to the movement of the marine vessel, which may be complex. As described herein, the system 100 may filter out unintended motion detected by the sensor module 106. The marine vessel 10 may be equipped with one or more motion sensors for detecting the movement and/or orientation of the marine vessel 10 in the body of water 11 relative to the Earth, such as may be caused by waves, wind, propulsion, weight-shifting, etc. This motion of the marine vessel 10 may cause corresponding motion of the user, which may be detected as a change in orientation by the sensor module 106. In order to prevent unintended gestures or commands detected in response to user position changes detected by the sensor module 106, the controller 102 may track the motion data of the marine vessel 10 and apply one or more filters to the change in orientation data from the sensor module 106 to correct for orientation changes caused by the marine vessel 10 versus orientation changes intended by the user.

In some embodiments, the controller 102 may be configured to automatically receive motion capture data recorded by one or more cameras. For example, the controller 102 may analyze the motion capture data to detect and record a cast, catch, or bite, such as for tabulating fishing data, which may be very useful for a fisherman. In this way, fishing data may be collected and stored automatically and accurately without requiring the user's time to record information.

In some embodiments, the motion sensor may include one or more optical cameras for capturing images of the field of view. Other known motion capture technologies may be used. The system 100 may include features that are configured to work with the one or more cameras such as auto-focus, face detection, depth detection, fast scanning, auto white balance, light sensing, optical and/or digital zoom, etc.

In some embodiments, the sensor module 106 may include a three-dimensional scanner.

In some embodiments, the motion sensor may include a light (e.g., 3D laser) pattern projection onto the field of view for comparing changes to the reflected light pattern in order to determine the relative positions of objects within the field of view over time. In some embodiments, the system 100 may monitor a plurality of tracking points located on a body, a fishing rod, or points on a fish. For example, a fisherman's elbow may be a tracking point. As the fisherman moves his elbow, the system 100 may detect the motion of the tracking point. The location for tracking points may be selected by identifying specific patterns or structures. In one implementation, a fisherman may wear one or more devices with sensors, such as accelerometers, and the sensor data may be used in combination with the data captured by the cameras in the sensor module 106.

As shown in FIG. 9, the controller 102 may be in communication with the sensor module 106 and a marine device 104. Although the controller 102 is illustrated in FIG. 9 as attached to the helm, other system configurations for capturing motion data are contemplated herein. For example, the cameras may be installed in or mounted on the marine vessel 10 and positioned to capture video or images from multiple angles. For example, one set of cameras may be positioned at the front (e.g., bow) of the marine vessel, and another set of cameras may be positioned at the back (e.g., stern) of the marine vessel. Some or all of the cameras may be pointed towards the center of the marine vessel, such that the system may capture videos or images of a user (e.g., fisherman) from two or more different angles. In some embodiments, one or more cameras may be located in the marine device 104.

In one aspect, the motion sensor of the sensor module 106 may be used to capture data of a fish, users, etc. For example, in some embodiments, the motion sensor may perform a three-dimensional scan of the fish, users, etc. Data from the motion sensor may be transmitted to the marine device 104 via the controller 102 such that the particular fish species or user identity may be recognized by the system.

The controller 102 may analyze the motion capture data received from the sensor module 106 to detect one or more fishing events. The fishing events may include casts, catches, bites, fish on the line, fish off the line, start of a fight, end of a fight, or other events that occur during a fishing trip. In some embodiments, the motion capture data may be compared to previously recorded motion capture data. For example, the motion capture data may be compared to previously recorded motion capture data of user making casts. In some embodiments, the speed and direction of motion in the motion capture data may be analyzed to detect a fishing event.

The motion capture data and any related data detected by the sensor module 106 and/or the location/time data may be stored to memory and/or transmitted to a cloud software service for storage or further processing.

Motion capture may be used continuously during a boating trip to record and detect events/actions throughout the trip. For example, a motion capture device may be activated at the beginning of a trip and deactivated at the end of the trip. The controller 102 may continuously analyze motion capture data recorded by the motion capture device and respond to events/actions as they occur. In this manner, events may be automatically detected, responded to, and/or recorded during a trip without any user input.

In some embodiments, the motion sensor (e.g., cameras, three-dimensional cameras) may be located on a mobile media device 50 (e.g., smart phone, tablet, or other computing device) in communication with the sensor module 106, controller 102, and/or marine device 104.

Example systems and methods that could be utilized with various embodiments of the present disclosure, such as for capturing the motion of a user or other environmental features, are described further in U.S. Pat. No. 9,596,839, entitled "Motion Capture while Fishing", U.S. Pat. No. 10,114,470, entitled "Using Motion Sensing for Controlling a Display", and U.S. Patent Publication No. 2018/0365246, entitled "Livewell Operation and Control for a Vessel", which are all owned by the Assignee of the present application and incorporated herein by reference.

Example Systems with Vibration Sensor Control

In some embodiments, the systems and methods disclosed herein may use action detection to control operations of various marine devices 104 and features. For example, the system 100 may use the sensor module 106 to detect actions (e.g., vibrations) of the user.

Although the following example embodiments are described with the sensor module 106 being in or a part of a trolling motor assembly, some embodiments provide the sensor module 106 separately therefrom and/or integrated with other components, such as an MFD). In some embodiments, as shown in FIGS. 10-11, the sensor module 106 may be a part of a trolling motor assembly. The sensor module 106 may be included on/in the trolling motor pedal and/or input assembly. In some embodiments, the sensor module 106 may be built-in to the trolling motor such that certain actions, gestures, and/or conditions sensed by the trolling motor processor may be transmitted to the controller 102. For example, the sensor module 106 may be located within a foot pedal of the trolling motor assembly. In such embodiments, the controller 102 may include software features for controlling operations of a marine device 104 based on an action (e.g., series or pattern of actions performed in a certain order and/or within a specified time interval) detected by the sensor module 106. For example, the action may be a specific user action (e.g., stomp, kick, shout, specific spoken phrase) or series of actions detectable by one or more sensors within the sensor module 106.

As shown in FIG. 10, in some embodiments, when the trolling motor assembly 20 is attached to the marine vessel 10 and the trolling motor (or trolling motor housing) is submerged in the water, the trolling motor is configured to propel the marine vessel 10 to travel along the body of water 11. In addition to containing the trolling motor, the trolling motor housing may include other components described herein, including, for example, a sonar transducer assembly (e.g., the sonar transducer assembly 448 shown in and described with respect to FIG. 12) and/or one or more other sensors (e.g., other sensors 445 shown in and described with respect to FIG. 12, motor sensor, position sensor, water temperature sensor, current sensor), which may each be controlled through the controller 102 (e.g., processor 410) such as detailed herein.

The trolling motor assembly 20 may be electric and hand controlled using a hand control rod that enables control of the trolling motor by a user (e.g., through angular rotation). The main housing may be configured to house components of the trolling motor assembly 20, such as may be used for processing marine or sensor data and/or controlling operation of the trolling motor, among other things. For example, depending on the configuration and features of the trolling motor assembly 20, the main housing may contain one or more of a processor, fuzzy controller, memory, location sensor, position sensor, communication interface, user interface, power supply, and display. The trolling motor assembly 20 may also include an attachment device (e.g., a clamp or other attachment means) to enable connection or attachment of the trolling motor assembly 20 to the marine vessel 10. Depending on the attachment device used, the trolling motor assembly 20 may be configured for rotational movement relative to the marine vessel 10, including, for example, 360° rotational movement.

As shown in FIG. 10, the trolling motor assembly 20 may include the sensor module 106 in its main housing. The sensor module 106 may include a vibration sensor (e.g., microphone) for detecting vibrations, such as vibrations (e.g., vocalizations) caused by the user. In this way, the user may use the sensor module 106 of the trolling motor assembly 20 to control various marine devices 104 with voice commands via the controller 102.

There are many methods possible for using and/or operating a voice-controlled marine device 104 in accordance with various embodiments described herein. The methods may be performed by a voice-controlled marine device 104, such as a voice-controlled MFD and/or trolling motor assembly 20.

The display of the trolling motor assembly 20 and/or mobile media device 50 may display a selectable voice command icon. In some instances, a voice command icon associated with a voice command mode of operation may be displayed on a display component of a marine device 104. Selecting the voice command icon may activate a voice command mode of operation. In some instances, the voice command mode of operation may be activated based on receiving the input selection signal corresponding to the input received via selecting the voice command icon. In some embodiments, the voice command mode of operation may be activated using a motion sensor of the sensor module 106, as described herein.

The sensor module 106 may include a microphone configured to receive one or more voice commands for performing one or more marine based tasks. The microphone may be configured to receive audio input for one or more voice commands, such as audio signals or vibrations associated with human vocalized sounds associated with annunciation of one or more words, for example. In some instances, the one or more tasks may include marine based tasks, such as altering, modifying, and/or changing a mode of operation and/or altering, modifying, or changing output displayed on the display screen. The microphone may include an acoustic-to-electric transducer or sensor that is configured to convert sound waves passing through an air medium into an electrical signal, which may be referred to as an analog audio signal. The microphone may be configured to utilize various technologies related to sound capture (e.g., condenser type microphones, piezoelectric type microphones, dynamic microphones) to produce electrical signals from air pressure variations or vibrations. In some implementations, the system 100 may include one or more amplifiers (e.g., preamplifier, audio power amplifier) that may be connected to the microphone before the received analog audio signal is recorded or digitized (e.g., digitally converted).

In some embodiments, the sensor module 106 may include a processor and memory including instructions that cause the processor to perform the one or more marine based tasks corresponding to the one or more voice commands received via the microphone. In some embodiments, the sensor module 106 may interface with the controller 102 of the marine vessel such that the controller 102 may cause a marine device to perform the one or more marine based tasks.

The controller 102 may receive one or more voice commands from a microphone (e.g., built-in microphone or wireless microphone) of the sensor module 106. The one or more voice commands may include one or more human vocalized sounds associated with annunciation of one or more words. The one or more voice commands may be received as analog audio input via a microphone. The received analog audio input may be stored in memory. The controller 102 may be further configured to perform one or more marine based tasks corresponding to the one or more voice commands received as audio input via the microphone. As shown in FIG. 10, the user may yell "Stop the boat!", and the system 100 may cause marine devices 104 to take actions to stop the marine vessel 10. Some non-limiting examples of voice commands include volume-up, volume-down, display sonar, display chart, man overboard (MOB), record sonar, stop recording sonar, way point, new route, and various other words and/or phrases that may be associated with marine based applications. In some embodiments, the memory may include instructions that may cause the processor to associate the one or more voice commands to a predetermined set of operations to perform the one or more marine based tasks corresponding to the one or more voice commands. In some implementations, the instructions may further cause the processor to compare the digital audio data with one or more predetermined digital audio files stored in the memory (or in a trainable database). If a close enough match is identified, the instructions may cause the processor to retrieve the predetermined set of operations to perform the one or more marine based tasks corresponding to the one or more voice commands. If a match is not identified, the instructions may cause the processor to provide feedback or an indication (e.g., lights flashing or blinking, audible warning signal) to a user that no matching voice command was identified. Likewise, the system 100 may include a filtering module for ignoring/filtering out unintentional vocalizations made by the user. Further, the filtering module may identify whether or not the detected sound vibrations were caused by the user versus other incidental noise.

In some embodiments, the microphone may be wired or otherwise connected to the sensor module 106 and/or the controller 102. In some embodiments, the microphone may be wireless. In such embodiments, the microphone may be configured to transmit wireless signals corresponding to the one or more voice commands. The controller 102 may include a processor and memory including instructions that cause the processor to receive the wireless signals from the wireless microphone, process the wireless signals to identify the one or more voice commands, and perform one or more tasks corresponding to the one or more voice commands. In various implementations, operation of the wireless microphone may depend on an activation state (e.g., on/off, listening mode, muted, communication channel open/closed) of the sensor module 106 and/or wireless microphone. The activation state may be controlled by a switch, button, and/or user input assembly configured to receive a mode selection indicated by the user.

In various implementations, the sensor module 106 and/or wireless microphone may be coupled to the user (e.g., coupled to a user's wrist or jacket) for ease of use and/or ensuring that the microphone is within vocal range of a user's mouth. In some embodiments, the sensor module 106 and/or microphone may include far field listening technology such that allows the user to easily speak voice commands into the microphone without having to be close to the microphone.

The controller 102 may cause a marine device 104 to perform a task associated with the received voice command. In some instances, controller 102 may perform one or more tasks (e.g., marine based tasks) corresponding to the one or more voice commands received via the microphone. The one or more voice commands may be associated with a predetermined set of operations (or set of instructions) to perform one or more tasks (e.g., marine based tasks) corresponding to the one or more voice commands.

Example systems and methods that could be utilized with various embodiments of the present disclosure, such as for receiving audio input for one or more voice commands, are described further in U.S. Pat. No. 9,507,562, entitled "Using Voice Recognition for Recording Events", and U.S. Patent Publication No. 2016/0253150, entitled "Voice Controlled Marine Electronics Device", which are both owned by the Assignee of the present application and incorporated herein by reference.

When trolling for fish, a marine display may be useful for providing data and images to a user as well as interfacing with various marine devices 104. However, in some instances, when a user's hands are busy (e.g., holding a fishing pole), it may be difficult for the user to physically adjust or change the display. Thus, using the vibration sensor of the sensor module 106 may enable the user to control the marine devices 104 of the system 100 in a hands-free way.

As shown in FIG. 11, the trolling motor assembly 20 may also include a foot pedal housing 130 that is electrically connected to the trolling motor (such as through the main housing) using a cable. In some embodiments, the foot pedal may be wirelessly connected. The foot pedal housing 130 may include a foot pedal that enables the user to steer and/or otherwise operate the trolling motor to control the direction and speed of travel of the marine vessel 10. The foot pedal housing 130 may also contain the sensor module 106 for sensing vibrations caused by the user's actions.

Though described as being contained in one or more of the main housing, trolling motor housing, or foot pedal housing, the sensor module 106 and/or various components described herein can be contained in any one of the various (or other) housings within the trolling motor assembly.

In some embodiments, the one or more sensors within the sensor module 106 may exist as part of the foot pedal in the trolling motor assembly. For example, the foot pedal may include an orientation sensor (e.g., magnetic rotational sensor) for detecting the rotational orientation or angle of the pedal with respect to the base. Tapping twice rapidly on the foot pedal may cause the orientation sensor to detect the repeated slight changes to the rotational orientation of the pedal with respect to the base. The sensor module 106 may transmit a signal to the controller 102 based on this detected tapping. The controller 102 may then receive the tapping signal from the sensor module 106, recognize the tapping as a predetermined action pattern, and initiate certain features based on the recognized predetermined action pattern.

In some embodiments, initiation of certain features within the system 100 may include features of one or more marine devices 104. For example, tapping twice on the foot pedal of the trolling motor assembly 20 may trigger the system to initiate (e.g., drop) the anchor of the marine vessel 10.

In some embodiments, the one or more sensors within the sensor module 106 may exist in addition to the trolling motor assembly 20. For example, as shown in FIG. 11, a vibration sensor (e.g., accelerometer, microphone, seismometer) may be added to the foot pedal of the trolling motor assembly as part of the sensor module 106. The vibration sensor may be configured to detect a user stomping on the deck with his foot near the foot pedal to initiate the anchor. In this way, the user may conveniently initiate an anchor without the need to locate a small or remote button. For example, a user may have a fish on the line and be focused on completing the task at hand, so taking a hands-free action without worrying about the position of the action may be much easier without requiring any shifted focus.

In some embodiments, the length of a pattern detected by the sensor module 106 may be interpreted by the controller 102 as a short press or long press to differentiate between separate commands.

In some embodiments, the system 100 may include a filtering module for ignoring/filtering unintentional vibrations detected by the sensor module 106. For example, the system 100 may be tuned to require a certain threshold for the magnitude of the vibrations before the sensor module 106 and/or controller 102 will register the vibrations. In some embodiments, the system 100 may be optimized to filter out unintentional vibrations detected by the sensor module 106. For example, the controller 102 may recognize if a user is just walking by the sensor module 106 or if the user is simply adjusting positions (e.g., due to motion of the marine vessel 10).

In some implementations, the system 100 may be configured to receive geo-coordinate data, such as global positioning system data (e.g., GPS data), via a GPS receiver or transceiver and display the received GPS data on the display. In some instances, the vibrations caused by the user and detected by the sensor module 106 may cause the system 100 to display GPS coordinate data on the display. The system 100 may include a network server. The controller 102 may be configured to communicate with the sensor module 106 and receive one or more commands from the user via audio input signals or vibrations. The sensor module 106 and/or vibration sensor may be configured to transmit wireless signals (e.g., audio input signals or vibrations) corresponding to the one or more commands via a network interface. The network interface of the sensor module 106 and/or vibration sensor may include a transceiver or transmitter configured to communicate with the network interface of the controller 102 and/or marine device 104. The network interface of the controller 102 may include a transceiver or receiver configured to receive the wireless signals (e.g., audio input signals or vibrations) from the sensor module 106. Further, the controller 102 may include instructions stored in the memory that cause the processor to receive the wireless signals from the sensor module 106, process the wireless signals to identify the one or more commands, and perform one or more navigational tasks associated with the one or more commands.

Example systems and methods that could be utilized with various embodiments of the present disclosure, such as for controlling or otherwise operating routing, heading, and/or autopilot, are described further in U.S. Pat. No. 7,430,461, entitled "Networking Method and Network for Marine Navigation Devices", U.S. Pat. No. 9,135,731, entitled "Systems, Devices, Methods for Sensing and Processing Fishing Related Data", U.S. Pat. No. 9,594,375, entitled "Heading Control Using Multiple Autopilots", U.S. Pat. No. 10,025,312, entitled "Multiple Autopilot Interface", U.S. Pat. No. 10,451,732, entitled "Event Triggering Using Sonar Data", and U.S. Pat. No. 10,460,484, entitled "Systems and Associated Methods for Route Generation and Modification", which are all owned by the Assignee of the present application and incorporated herein by reference.

Example System Architecture

FIG. 12 shows a block diagram of an example system 400 capable for use with several embodiments of the present disclosure. As shown, the system 400 may include a number of different modules or components, each of which may comprise any device or means embodied in either hardware, software, or a combination of hardware and software configured to perform one or more corresponding functions. For example, the system 400 may include a marine electronics device 405 (e.g., controller 102) and an array of sensors.

The marine electronics device 405, controller 102, remote control, MFD, and/or user interface display may include a processor 410 (which may include a fuzzy controller), a memory 420, a communication interface 430, a user interface 435, a display 440, and one or more sensors (e.g., a position sensor 445, sensor module 106, and/or other sensors 447).

In some embodiments, the system 400 may be configured such that the one or more processors electrically control various marine devices 104 (e.g., propulsion system 110, sonar system 120) in addition to the features described herein. This forms a compact and integrated system.

In some embodiments, the system 400 may be configured to receive, process, and display various types of marine data. In some embodiments, the system 400 may include one or more processors 410 and a memory 420. Additionally, the system 400 may include one or more components that are configured to gather marine data or perform marine features. In such a regard, the processor 410 may be configured to process the marine data and generate one or more images corresponding to the marine data for display on the screen that is integrated in the MFD. Further, the system 400 may be configured to communicate with various internal or external components (e.g., through the communication interface 430), such as to provide instructions related to the marine data.

The processor 410 (which may include, for example, a fuzzy controller) may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide display data to the display to indicate the direction of the sonar system 120 relative to the marine vessel 10.

In some example embodiments, the processor 410 may be configured to receive sonar data indicative of the size, location, shape, etc. of objects detected by the system 400. For example, the processor 410 may be configured to receive sonar return data and process the sonar return data to generate sonar image data for display to a user (e.g., on display 440 or a remote display). In some embodiments, the processor 410 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 410 may further implement notices and/or alarms (e.g., alerts determined or adjusted by a user) to reflect depth measurements, the presence of fish, the proximity of other marine vessels, status or notifications for peripheral devices/systems, etc. The processor 410 and memory 420 may form processing circuitry.

The memory 420 may be configured to store instructions, computer program code, marine data (e.g., sonar data, chart data, location/position data), and/or other data associated with the system 400 in a non-transitory computer readable medium for use by the processor, for example.

The system 400 may also include one or more communications modules configured to communicate via any of many known manners, such as via a network, for example. The processing circuitry and communication interface 430 may form a processing circuitry/communication interface. The communication interface 430 may be configured to enable connections to external systems (e.g., an external network 402 or one or more remote controls, such as a handheld remote control, MFD, foot pedal, or other remote computing device). In this regard, the communication interface (e.g., 430) may include one or more of a plurality of different communication backbones or frameworks, such as Ethernet, USB, CAN, NMEA 2000, GPS, Sonar, cellular, WiFi, and/or other suitable networks, for example. In this manner, the processor 410 may retrieve stored data from a remote, external server via the external network 402 in addition to or as an alternative to the onboard memory 420. The network may also support other data sources, including GPS, autopilot, engine data, compass, radar, etc. Numerous other peripheral, remote devices such as one or more wired or wireless multi-function displays may be connected to the system 400.

The processor 410 may configure the device and/or circuitry to perform the corresponding functions of the processor 410 as described herein. In this regard, the processor 410 may be configured to analyze electrical signals communicated thereto to provide, for example, various features/functions described herein.

In some embodiments, the system 400 may be configured to determine the location of the marine vessel 10, such as through position sensor 445. Accordingly, the processor (such as through execution of computer program code) may be configured to receive the marine data from the position sensor, process the marine data to generate an image including a chart with the location from the position sensor, and cause the screen to display the image. Accordingly, the display 440 and/or user interface 435 may be configured to display the image including the chart.

The position sensor 445 may be configured to determine the current position and/or location of the system 400. For example, the position sensor 445 may comprise a GPS or other location detection system. The position sensor 445 may be found in one or more of the MFD, the trolling motor assembly, or remotely. In some embodiments, the position sensor 445 may be configured to determine a direction of which the marine vessel 10 is facing. In some embodiments, the position sensor 445 may be operably coupled to a rotational mechanism of a marine device 104, such that the position sensor 445 measures the rotational change in position of the trolling motor assembly 20 or sonar system 120 as the trolling motor or sonar view direction 122 is turned. The position sensor 445 may be a magnetic sensor, a light sensor, mechanical sensor, or the like.

In some embodiments, the system 400 may be configured to determine the location of the marine vessel 10, such as through location sensor. The system 400 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 410 may be configured to act as a navigation system. For example, the processor 410 may generate at least one waypoint and, in some cases, generate an image of a chart along with the waypoint for display by the screen. Additionally or alternatively, the processor may generate one or more routes associated with the watercraft. The location of the vessel, waypoints, and/or routes may be displayed on a navigation chart on a display remote from the system 400. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 440 and/or user interface 435 may be configured to display images associated with vessel or motor status (e.g., gauges) or other marine data.

In any of the embodiments, the display 440 may be configured to display an indication of the current direction of the marine vessel 10.

The display 440 may be configured to display images and may include or otherwise be in communication with a user interface 435 configured to receive input from a user. The display 440 may be, for example, a conventional liquid crystal display (LCD), LED/OLED display, touchscreen display, mobile device, and/or any other suitable display known in the art, upon which images may be displayed. The display may be integrated into the marine electronic device 405. In some example embodiments, additional displays may also be included, such as a touch screen display, mobile device, or any other suitable display known in the art upon which images may be displayed.

In some embodiments, the display 440 may present one or more sets of marine data and/or images generated therefrom. Such marine data may include chart data, radar data, weather data, location data, position data, orientation data, sonar data, and/or any other type of information relevant to the marine vessel 10. In some embodiments, the display 440 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally or alternatively, depth information, weather information, radar information, sonar information, and/or any other display inputs may be applied to and/or overlaid onto one another.

In some embodiments, the display 440 and/or user interface may be a screen that is configured to merely present images and not receive user input. In other embodiments, the display and/or user interface may be a user interface such that it is configured to receive user input in some form. For example, the screen may be a touchscreen that enables touch input from a user. Additionally or alternatively, the user interface may include one or more buttons (not shown) that enable user input.

Additionally, the display may be configured to display other relevant motor information including, but not limited to, speed data, motor data battery data, current operating mode, auto pilot, or the like. For example, in some example embodiments, the system 400 may include a plurality of operating modes, such as a manual or normal mode, an eco-mode, an anchor mode, an autopilot mode, a speed lock mode, a heading lock mode, or the like. The processor 410 may receive an indication of the current operating mode and generate display data indicative of the current operating mode. In an example embodiment, the mode may be represented by a number, letter, or character value displayed, such as on the seven segment display. Additionally or alternatively, each mode may be represented by a mode icon. For example, a manual mode may be represented by a manual mode icon, such as a propeller, an eco-mode may be represented by an eco-mode icon, such as a leaf, a speed lock mode may be represented by a speed lock icon, such as a vessel outline with arrow, an anchor lock mode may be represented by an anchor lock icon, such as an anchor, and a heading lock mode may be represented by a heading lock icon, such as a vessel outline with a directional indicator. In addition to the mode icons, other informational icons may also be provided. In an example embodiment, the digital display may include one or more of a speed icon, a battery icon, and a motor icon. These additional icons may be used to indicate the type of data displayed on the seven segment display. For example, no icon may be indicated when speed data is displayed, however, a battery icon or motor icon may be displayed to indicate battery data or motor data is being displayed, respectively.

The user interface 435 may include, for example, a keyboard, keypad, function keys, mouse, scrolling device, input/output ports, touch screen, or any other mechanism by which a user may interface with the system.

In some embodiments, the system 400 may comprise an autopilot that is configured to operate the propulsion system 110 and/or trolling motor assembly 20 to propel the marine vessel 10 in a direction and at a speed. In some embodiments, the autopilot may direct the marine vessel 10 to a waypoint (e.g., a latitude and longitude coordinate). Additionally or alternatively, the autopilot may be configured to direct the marine vessel 10 along a route, such as in conjunction with the navigation system. Further, additional autopilot features (e.g., anchoring) are also contemplated. In some example embodiment, the processor 410 may receive an indication of the motor operating condition being the autopilot mode. The processor 410 may generate display data based on the autopilot operating mode and cause an indication of the autopilot operating mode to be displayed on the digital display in the first portion, such as an autopilot icon.

In some embodiments, the system 400 may comprise a sonar system including a sonar transducer assembly 448. The sonar transducer assembly 448 may be housed in the sonar system 120 and/or trolling motor assembly 20 and configured to gather sonar data from the underwater environment relative to the marine vessel 10. Accordingly, the processor 410 (such as through execution of computer program code) may be configured to receive an indication of operation of the sonar transducer assembly 448. The processor 410 may generate additional display data indicative of the operation of the sonar transducer and cause the display data to be displayed on the digital display. For example, a sonar icon (not shown) may be energized to indicate that the sonar transducer is operating.

In some embodiments, the sonar system 120 may be used to determine depth and bottom topography, detect fish, locate wreckage, etc. Sonar beams, from a sonar transducer assembly 448, can be transmitted into the underwater environment. The sonar signals reflect off objects in the underwater environment (e.g., fish, structure, sea floor bottom, etc.) and return to the sonar transducer assembly, which converts the sonar returns into sonar data that can be used to produce an image of the underwater environment.

In an example embodiment, the system 400 may include a speed sensor, such as an electromagnetic speed sensor, paddle wheel speed sensor, or the like. The speed sensor may be configured to measure the speed of the marine vessel 10 through the water. The processor 410 may receive speed data from the speed sensor and generate additional display data indicative of the speed of the marine vessel 10 through the water. The speed data may be displayed, such as in text format on the first portion of the digital display. The speed data may be displayed in any relevant unit, such as miles per hour, kilometers per hour, feet per minute, or the like. In some instances, a unit identifier, such as a plurality of LEDs, may be provided in association with the display (may be shown in normal text or with a seven digit display). The processor 410 may cause an LED associated with the appropriate unit for the speed data to be illuminated.

In some example embodiments, the system 400 may include a motor sensor. The motor sensor may be a voltage sensor, a rotation per minute (RPM) sensor, a current sensor, or other suitable sensor to measure the output of the trolling motor and/or propulsion system 110. The processor 410 may receive the motor data from the motor sensor and determine a motor output. In an example embodiment, the motor data may be compared to a data table (which may be stored in memory 420) to determine a motor output, such as a percentage of maximum motor output. The processor 410 may generate additional display data indicative of the motor output and cause the display data to be displayed in the first portion of the digital display. For example, the motor data may be the measured voltage, current, or RPM displayed in the display, a percentage of the maximum motor output displayed in the display or graphically in a segment bar, a high or low motor output warning light, or other suitable display. The segment bar may include a plurality of display segments which may be energized or de-energized to indicate a corresponding proportion of the maximum output of the motor.

In some embodiments, the system 400 further includes a power source (e.g., battery) that is configured to provide power to the various components. In some embodiments, the power source is rechargeable. In some example embodiments, the system 400 includes a battery sensor. The battery sensor may include a current sensor or voltage sensor configured to measure the current charge of a battery power supply of the system 400 (e.g., the power source). The battery sensor may be configured to measure individual battery cells or measure a battery bank. The processor 410 may receive battery data from the battery sensor and determine the remaining charge on the battery. In an example embodiment, the voltage or current measured by the battery sensor may be compared to a reference value or data table, stored in memory 420, to determine the remaining charge on the battery.

In some embodiments, the system 400 may include other sensors. For example, in some embodiments, the system 400 may include an accelerometer for measuring acceleration data, which may be logged by the processor. The acceleration data may be utilized for maintenance, warranties, accident investigation, and/or product data collection for quality control. In some embodiments, the system 400 may include an accelerometer, a gyroscope, and/or a magnetometer, which may be portions of a micro-electro-mechanical system (MEMS). In some embodiments, the accelerometer may be a variable capacitive (VC) MEMS accelerometer, a piezoresistive (PR) MEMS accelerometer, or the like. The gyroscope may be configured to measure angular velocity. In some embodiments, the gyroscope may be a vibrating structure MEMS gyroscope including gyroscopic sensors oriented in a plurality of axes. The magnetometer may be configured to measure magnetic field strength, which can be used to find magnetic north and/or heading angle. In some embodiments, the magnetometer may be a Lorentz force based MEMS sensor, electron tunneling MEMS sensor, MEMS compass, or the like.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hardwired links, wireless links, or combinations thereof). In a distributed computing environment, program modules may be located in both local and remote computer storage media including memory storage devices.

The system 400 may include a computer device or system 450 (e.g., mobile media device 50) into which implementations of various technologies and techniques described herein may be implemented. Computing system 450 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 450 may include a central processing unit (CPU), a system memory and a system bus that couples various system components including the system memory to the CPU. In some implementations the computing system 450 may include more than one CPU.

The CPU can include a microprocessor, a microcontroller, a processor, a programmable integrated circuit, or a combination thereof. The CPU can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU may also include a proprietary processor. The CPU may include a multi-core processor.

The CPU may provide output data to a Graphics Processing Unit (GPU). The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. In one implementation, the CPU may perform the tasks of the GPU. A video adapter may be provided to convert graphical data into signals for a monitor. The monitor includes a screen. The screen can be sensitive to heat or touching (now collectively referred to as a "touch screen"). In one implementation, the computer system 450 may not include a monitor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system 450, such as during start-up, may be stored in the ROM. The computing system may be implemented using a printed circuit board containing various components including processing units, data storage memory, and connectors.

Certain implementations may be configured to be connected to a GPS and/or a sonar system. The GPS and/or sonar system may be connected via the network interface or Universal Serial Bus (USB) interface. In one implementation, the computing system 450, the monitor, the screen and buttons may be integrated into a console.

The computing system 450 may further include a hard disk drive for reading from and writing to a hard disk, a memory card reader for reading from and writing to a removable memory card and an optical disk drive for reading from and writing to a removable optical disk, such as a CD ROM, DVD ROM or other optical media. The hard disk drive, the memory card reader, and the optical disk drive may be connected to the system bus by a hard disk drive interface, a memory card interface, and an optical drive interface, respectively. The drives and their associated computer-readable media may provide nonvolatile storage of computer-readable instructions, data structures, program modules and other data for the computing system 450.

Although the computing system 450 is described herein as having a hard disk, a removable memory card, and a removable optical disk, it should be appreciated by those skilled in the art that the computing system 450 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 450. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 450 may also include a host adapter that connects to a storage device via a small computer system interface (SCSI) bus, a Fiber Channel bus, an eSATA bus, or using any other applicable computer bus interface. The computing system 450 can also be connected to a router to establish a wide area network (WAN) with one or more remote computers. The router may be connected to the system bus via a network interface. The remote computers can also include hard disks that store application programs.

In another implementation, the computing system 450 may also connect to one or more remote computers via local area network (LAN) or the WAN. When using a LAN networking environment, the computing system 450 may be connected to the LAN through the network interface or adapter. The LAN may be implemented via a wired connection or a wireless connection. The LAN may be implemented using Wi-Fi technology, cellular technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers. It will be appreciated that the network connections shown are exemplary and other means of establishing a communications link between the computer systems may be used. The network interface may also include digital cellular networks, Bluetooth, or any other wireless network interface.

A number of program modules may be stored on the hard disk, memory card, optical disk, ROM, or RAM, including an operating system, one or more application programs, program data, and a database system. The one or more application programs may contain program instructions configured to perform methods (e.g., method 700, 800, 900) according to various implementations described herein. The operating system may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 450 through input devices such as a keyboard and pointing device. Other input devices may include a microphone, joystick, game pad, satellite dish, scanner, user input button, wearable device, or the like. These and other input devices may be connected to the CPU through a USB interface coupled to system bus, but may be connected by other interfaces, such as a parallel port, Bluetooth or a game port. A monitor or other type of display device may also be connected to system bus via an interface, such as a video adapter. In addition to the monitor, the computing system 450 may further include other peripheral output devices such as speakers and printers.

In various implementations, each marine electronic device 405 described herein may be referred to as a marine device 104 or as an MFD. The marine electronic device 405 may include one or more components disposed at various locations on a marine vessel. Such components may include one or more data modules, sensors, instrumentation, and/or any other devices known to those skilled in the art that may transmit various types of data to the marine electronic device 405 for processing and/or display. The various types of data transmitted to the marine electronic device 405 may include marine electronics data and/or other data types known to those skilled in the art. The marine data received from the marine electronic device 405 or system 400 may include chart data, sonar data, structure data, radar data, navigation data, position data, heading data, automatic identification system (AIS) data, Doppler data, speed data, course data, or any other type known to those skilled in the art.

In one implementation, the marine electronic device 405 may include a radar sensor for recording the radar data and/or the Doppler data, a compass heading sensor for recording the heading data, and a position sensor for recording the position data. In another implementation, the marine electronic device 405 may include a sonar transducer for recording the sonar data, an AIS transponder for recording the AIS data, a paddlewheel sensor for recording the speed data, and/or the like.

The marine electronic device 405 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 405 may be attached to various buses and/or networks, such as a National Marine Electronics Association (NMEA) bus or network, for example. The marine electronic device 405 may send or receive data to or from another device attached to the NMEA 2000 bus. For instance, the marine electronic device 405 may transmit commands and receive data from a motor or a sensor using an NMEA 2000 bus. In some implementations, the marine electronic device 405 may be capable of steering a marine vessel and controlling the speed of the marine vessel (e.g., autopilot). For instance, one or more waypoints may be input to the marine electronic device 405, and the marine electronic device 405 may be configured to steer the marine vessel to the one or more waypoints. Further, the marine electronic device 405 may be configured to transmit and/or receive NMEA 2000 compliant messages, messages in a proprietary format that do not interfere with NMEA 2000 compliant messages or devices, and/or messages in any other format. In various other implementations, the marine electronic device 405 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 405 may communicate with various other devices on the marine vessel 10 via wireless communication channels and/or protocols.

In some implementations, the marine electronic device 405 may be connected to a global positioning system (GPS) receiver. The marine electronic device 405 and/or the GPS receiver may be connected via a network interface. In this instance, the GPS receiver may be used to determine position and coordinate data for a marine vessel on which the marine electronic device 405 is disposed. In some instances, the GPS receiver may transmit position coordinate data to the marine electronic device 405. In various other instances, any type of known positioning system may be used to determine and/or provide position coordinate data to/for the marine electronic device 405.

The marine electronic device 405 may be configured as a computing system similar to computing device 450.

Described herein are implementations of various technologies for a non-transitory computer-readable medium having stored thereon computer-executable instructions which, when executed by a computer, cause the computer to perform various actions. The actions may include displaying buttons or icons corresponding to a plurality of autopilots. The actions may include receiving a selection of one of the autopilots. The actions may include displaying autopilot commands corresponding to the selected autopilot. The actions may include receiving a selection of one of the commands. The actions may also include transmitting a message corresponding to the selected command to the selected autopilot.

Described herein are also implementations of various technologies for an apparatus for displaying marine electronic data. The device includes one or more processors, a screen configured to display marine data, and a memory. The memory has a plurality of executable instructions. When the executable instructions are executed by the one or more processors, the processors may display buttons or icons corresponding to a plurality of autopilots. The processors may receive a selection of one of the autopilots. The processors may display autopilot commands corresponding to the selected autopilot. The processors may receive a selection of one of the commands. The processors may also transmit a message corresponding to the selected command to the selected autopilot.

Described herein are also implementations of various technologies for a non-transitory computer-readable medium having stored thereon computer-executable instructions which, when executed by a computer, cause the computer to perform various actions. The actions may include receiving a selection of a first autopilot from a plurality of autopilots. The actions may include receiving a command for the first autopilot. The actions may include transmitting a first message to a second autopilot. The first message includes instructions to deactivate the second autopilot. The actions may also include transmitting a second message corresponding to the command to the first autopilot.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example Flowchart(s)

Embodiments of the present disclosure provide methods for operating various marine devices based on signals sent to the controller from the sensor module. Various examples of the operations performed in accordance with embodiments of the present disclosure will now be provided with reference to FIGS. 13-15.

FIG. 13 illustrates a flowchart according to an example method for operating a sonar system according to an example embodiment 700. The operations illustrated in and described with respect to FIG. 13 may, for example, be performed by, with the assistance of, and/or under the control of one or more of the processor 410, sensor module 106, memory 420, communication interface 430, user interface 435, display 440, sonar transducer assembly 448, position sensor 445, computing device 450, remote server 460, and/or other components described herein.

Operation 702 may comprise setting or detecting a first orientation, which may include setting an initial orientation of the sensor module 106 to zero. The processor 410, sensor module 106, mobile media device 50, and/or computing device 450 may, for example, provide means for performing operation 702. Operation 704 may comprise detecting a new (e.g., second) orientation of the sensor module 106 in three-dimensional space. The processor 410, sensor module 106, mobile media device 50, and/or computing device 450 may, for example, provide means for performing operation 704. Operation 706 may comprise transmitting the first and second orientations of the sensor module 106 to the controller 102. The processor 410, sensor module 106, mobile media device 50, and/or computing device 450 may, for example, provide means for performing operation 706. At operation 708, the method 700 may comprise generating a raw orientation difference data set by comparing the first orientation to the second orientation. The controller 102, processor 410, sensor module 106, mobile media device 50, and/or computing device 450 may, for example, provide means for performing operation 708. At operation 710, the method 700 may comprise determining a difference in orientation by correcting the raw orientation difference data set using a marine compensation data set that is based on the movement of the marine vessel 10 during the time interval between the initial and new orientations detected by the sensor module 106. The controller 102, processor 410, sensor module 106, mobile media device 50, and/or computing device 450 may, for example, provide means for performing operation 710. At operation 712, the method 700 may comprise determining the three-dimensional orientation based on the determined difference in orientation and causing the display 40 to display marine images corresponding to the three-dimensional orientation. The controller 102, processor 410, display 440, sensor module 106, mobile media device 50, and/or computing device 450 may, for example, provide means for performing operation 712.

FIG. 14 illustrates a flowchart according to an example method for operating a sonar system according to an example embodiment 800. The operations illustrated in and described with respect to FIG. 14 may, for example, be performed by, with the assistance of, and/or under the control of one or more of the processor 410, sensor module 106, memory 420, communication interface 430, user interface 435, display 440, sonar transducer assembly 448, position sensor 445, computing device 450, remote server 460, and/or other components described herein.

Operation 802 may comprise detecting a first position of one or more objects in a field of view of the sensor module 106 at a first time. The controller 102, processor 410, sensor module 106, mobile media device 50, and/or computing device 450 may, for example, provide means for performing operation 802. Operation 804 may comprise detecting a second position of the one or more objects in the field of view of the sensor module 106 at a second time. The controller 102, processor 410, sensor module 106, mobile media device 50, and/or computing device 450 may, for example, provide means for performing operation 804. Operation 806 may comprise transmitting the first and second positions detected by the sensor module 106 to the controller 102. The controller 102, processor 410, sensor module 106, mobile media device 50, and/or computing device 450 may, for example, provide means for performing operation 806. At operation 808, the method 800 may comprise generating a difference data set by comparing the first and second positions of the one or more objects detected in the field of view of the sensor module 106. The controller 102, processor 410, sensor module 106, mobile media device 50, and/or computing device 450 may, for example, provide means for performing operation 808. At operation 810, the method 800 may comprise modifying the difference data set by filtering data falling within a marine vessel movement data set that is based on the movement of the marine vessel 10 during the time interval between first and second times. The controller 102, processor 410, sensor module 106, mobile media device 50, and/or computing device 450 may, for example, provide means for performing operation 810. At operation 812, the method 800 may comprise identifying gestures from the modified difference data set to determine a desired action and transmit a command signal to the marine device 104 according to the desired action. The controller 102, processor 410, display 440, sensor module 106, mobile media device 50, and/or computing device 450 may, for example, provide means for performing operation 812.

FIG. 15 illustrates a flowchart according to an example method for operating a sonar system according to an example embodiment 900. The operations illustrated in and described with respect to FIG. 15 may, for example, be performed by, with the assistance of, and/or under the control of one or more of the controller 102, sensor module 106, processor 410, memory 420, communication interface 430, user interface 435, display 440, sonar transducer assembly 448, position sensor 445, computing device 450, remote server 460, and/or other components described herein.

Operation 902 may comprise detecting vibrations using the sensor module 106. The controller 102, processor 410, sensor module 106, mobile media device 50, and/or computing device 450 may, for example, provide means for performing operation 902. Operation 904 may comprise ignoring/filtering detected vibrations if they are determined not to be intentionally caused by the user. The controller 102, processor 410, sensor module 106, mobile media device 50, and/or computing device 450 may, for example, provide means for performing operation 904. Operation 906 may comprise determining if the detected vibrations match a predetermined pattern stored in a database. The controller 102, processor 410, sensor module 106, mobile media device 50, and/or computing device 450 may, for example, provide means for performing operation 906. Operation 908 may comprise generating and transmitting a vibration signal to the controller 102 if the vibrations detected by the sensor module 106 match the predetermined pattern. The controller 102, processor 410, sensor module 106, mobile media device 50, and/or computing device 450 may, for example, provide means for performing operation 908. At operation 910, the method 900 may comprise transmitting a signal to the marine device 104 based on the received vibration signal to cause the marine device 104 to perform an operation (e.g., change a state/mode of operation, perform a function, etc.). The controller 102, processor 410, sensor module 106, mobile media device 50, marine device 104, and/or computing device 450 may, for example, provide means for performing operation 910.

FIGS. 13-15 illustrate flowcharts of a system, method, and/or computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410 or controller 102. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the method for operating various marine devices may include additional, optional operations, and/or the operations described above may be modified or augmented.

CONCLUSION

Many modifications and other embodiments of the disclosures set forth herein will come to mind to one skilled in the art to which these present disclosures pertain having the benefit of the teachings presented in the foregoing descriptions and the associated drawings. Therefore, it is to be understood that the embodiments of the present disclosure are not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated within the scope of the present disclosure. Although specific terms are employed herein, they are used in a generic and descriptive sense only and not for purposes of limitation.

The invention claimed is:

1. A system for controlling operations of a marine vessel, the system comprising:
a user input device with a three-dimensional orientation sensor configured to:
detect a first orientation of the user input across three dimensional axes,
detect a second orientation of the user input device across the three dimensional axes after a time interval with respect to detecting the first orientation, and transmit the first orientation and the second orientation;
a display; and
a controller configured to:
receive the first orientation and the second orientation from the user input device,
generate a raw orientation difference data set by comparing the first orientation to the second orientation,
determine a difference in orientation by correcting the raw orientation difference data set using a marine vessel motion compensation data set, wherein the marine vessel motion compensation data set is based on movement of the marine vessel during the time interval,
determine a three-dimensional orientation based on the determined difference in orientation,
generate and transmit an electrical signal corresponding to the determined three-dimensional orientation, and
cause the display to display one or more marine images corresponding to the determined three-dimensional orientation.

2. The system of claim 1, wherein the electrical signal corresponding to the determined three-dimensional orientation causes a sonar device to adopt an orientation corresponding to the determined three-dimensional orientation.

3. The system of claim 1, wherein the display is within a virtual reality headset.

4. The system of claim 1, wherein the user input device is a mobile media device.

5. The system of claim 4, wherein the display is located on the mobile media device.

6. The system of claim 1, wherein the one or more marine images include real time sonar data.

7. The system of claim 1, wherein the movement of the marine vessel during the time interval is captured by an accelerometer.

8. The system of claim 1, wherein the controller is further configured to:
process the determined difference in orientation to determine whether the difference in orientation is an unintended command.

9. A marine electronic device for controlling operations of a marine vessel, the marine electronic device comprising:
a display; and
a controller configured to:
receive, from a user input device, first orientation and second orientation, wherein the first orientation of the user input is across three dimensional axes, wherein the second orientation of the user input is across the three dimensional axes after a time interval with respect to detection of the first orientation,
generate a raw orientation difference data set by comparing the first orientation to the second orientation,
determine a difference in orientation by correcting the raw orientation difference data set using a marine vessel motion compensation data set, wherein the marine vessel motion compensation data set is based on movement of the marine vessel during the time interval,
determine a three-dimensional orientation based on the determined difference in orientation,
generate and transmit an electrical signal corresponding to the determined three-dimensional orientation, and
cause the display to display one or more marine images corresponding to the determined three-dimensional orientation.

10. The marine electronic device of claim 9, wherein the electrical signal corresponding to the determined three-dimensional orientation causes a sonar device to adopt an orientation corresponding to the determined three-dimensional orientation.

11. The marine electronic device of claim 9, wherein the display is within a virtual reality headset.

12. The marine electronic device of claim 9, wherein the user input device is a mobile media device.

13. The marine electronic device of claim 12, wherein the display is located on the mobile media device.

14. The marine electronic device of claim 9, wherein the one or more marine images include real time sonar data.

15. The marine electronic device of claim 9, wherein the movement of the marine vessel during the time interval is captured by an accelerometer.

16. The marine electronic device of claim 9, wherein the controller is further configured to:
process the determined difference in orientation to determine whether the difference in orientation is an unintended command.

17. A method for controlling operations of a marine vessel, the method comprising:
receiving, from a user input device, first orientation and second orientation, wherein the first orientation of the user input is across three dimensional axes, wherein the second orientation of the user input is across the three dimensional axes after a time interval with respect to detection of the first orientation,
generating a raw orientation difference data set by comparing the first orientation to the second orientation,
determining a difference in orientation by correcting the raw orientation difference data set using a marine vessel motion compensation data set, wherein the marine vessel motion compensation data set is based on movement of the marine vessel during the time interval,
determining a three-dimensional orientation based on the determined difference in orientation,
generating and transmitting an electrical signal corresponding to the determined three-dimensional orientation, and
causing a display to display one or more marine images corresponding to the determined three-dimensional orientation.

18. The method of claim 17, wherein the electrical signal corresponding to the determined three-dimensional orientation causes a sonar device to adopt an orientation corresponding to the determined three-dimensional orientation.

19. The method of claim 17, wherein the display is within a virtual reality headset.

20. The method of claim 17, further comprising:
processing the determined difference in orientation to determine whether the difference in orientation is an unintended command.

\* \* \* \* \*